(12) United States Patent
Yook et al.

(10) Patent No.: US 10,599,336 B2
(45) Date of Patent: Mar. 24, 2020

(54) METHOD OF DISPLAYING CONTENT AND ELECTRONIC DEVICE ADAPTED TO THE SAME

(71) Applicant: SAMSUNG ELECTRONICS CO., LTD., Suwon-si, Gyeonggi-do (KR)

(72) Inventors: Hyungyoo Yook, Seoul (KR); Seoyoung Kim, Seoul (KR); Taeksu Kim, Seoul (KR); Sangheon Lee, Seoul (KR); Joonsub Lee, Osan-si (KR); Daegyun Chun, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 152 days.

(21) Appl. No.: 15/662,642

(22) Filed: Jul. 28, 2017

(65) Prior Publication Data

US 2018/0032259 A1 Feb. 1, 2018

(30) Foreign Application Priority Data

Jul. 28, 2016 (KR) .................. 10-2016-0096440

(51) Int. Cl.
| | | |
|---|---|---|
| *G06F 15/16* | (2006.01) | |
| *G06F 3/06* | (2006.01) | |
| *G06F 16/904* | (2019.01) | |
| *G06F 16/907* | (2019.01) | |
| *H04L 29/08* | (2006.01) | |
| *G06F 3/048* | (2013.01) | |

(52) U.S. Cl.
CPC ............ *G06F 3/0605* (2013.01); *G06F 3/048* (2013.01); *G06F 16/904* (2019.01); *G06F 16/907* (2019.01); *H04L 67/10* (2013.01); *H04L 67/1085* (2013.01); *H04L 67/1097* (2013.01)

(58) Field of Classification Search
CPC .... G06F 3/0605; G06F 16/907; G06F 16/904; G06F 3/048; H04L 67/10; H04L 67/1085
USPC ......................................................... 709/216
See application file for complete search history.

(56) References Cited

U.S. PATENT DOCUMENTS

| | | | | |
|---|---|---|---|---|
| 7,275,212 | B2 * | 9/2007 | Leichtling | ............. G06F 3/1454 345/629 |
| 8,639,747 | B2 * | 1/2014 | Seago | ..................... G06F 11/32 709/203 |
| 9,519,629 | B1 * | 12/2016 | Tajuddin | ............... G06F 17/227 |
| 10,002,115 | B1 * | 6/2018 | Killian | .................... H04L 47/70 |
| 2005/0193348 | A1 | 9/2005 | Nunez | |

(Continued)

FOREIGN PATENT DOCUMENTS

| | | |
|---|---|---|
| KR | 10-2014-0013251 | 2/2014 |
| KR | 10-2015-0057341 | 5/2015 |

OTHER PUBLICATIONS

International Search Report dated Nov. 17, 2017 in International Application No. PCT/KR2017/008145.

*Primary Examiner* — Anthony Mejia
(74) *Attorney, Agent, or Firm* — Nixon & Vanderhye P.C.

(57) ABSTRACT

A method of displaying content, and an electronic device adapted to the method are provided. The electronic device includes: a communication module comprising communication circuitry; a display; a memory for storing information regarding at least one piece of content; and a processor. The processor: registers a number of cloud servers; obtains at least one piece of content stored in the cloud servers; divides the obtained content into areas, based on the cloud servers; and displays the divided areas on a screen.

20 Claims, 22 Drawing Sheets

(56) References Cited

U.S. PATENT DOCUMENTS

| | | | |
|---|---|---|---|
| 2008/0310445 A1* | 12/2008 | Bellwood | H04N 21/238 370/468 |
| 2012/0089704 A1 | 4/2012 | Trahan et al. | |
| 2013/0271593 A1* | 10/2013 | Tsujimoto | G09G 5/02 348/79 |
| 2014/0026061 A1 | 1/2014 | Kim et al. | |
| 2014/0074967 A1 | 3/2014 | Lee | |
| 2014/0181301 A1* | 6/2014 | Yendluri | G06F 9/5072 709/225 |
| 2014/0189792 A1* | 7/2014 | Lesavich | H04L 63/10 726/3 |
| 2015/0009405 A1* | 1/2015 | Ko | H04N 21/4622 348/564 |
| 2015/0143299 A1 | 5/2015 | Kim et al. | |
| 2015/0178280 A1* | 6/2015 | DiMaria | H04L 65/60 707/736 |
| 2015/0205482 A1 | 7/2015 | Johnson et al. | |
| 2015/0249709 A1* | 9/2015 | Teng | G06F 16/13 707/785 |
| 2018/0032259 A1* | 2/2018 | Yook | G06F 3/048 |
| 2018/0082602 A1* | 3/2018 | Schlender | G06F 16/4393 |
| 2018/0330000 A1* | 11/2018 | Noble | G06F 16/438 |
| 2018/0341453 A1* | 11/2018 | Nakagawa | G06F 3/165 |

* cited by examiner

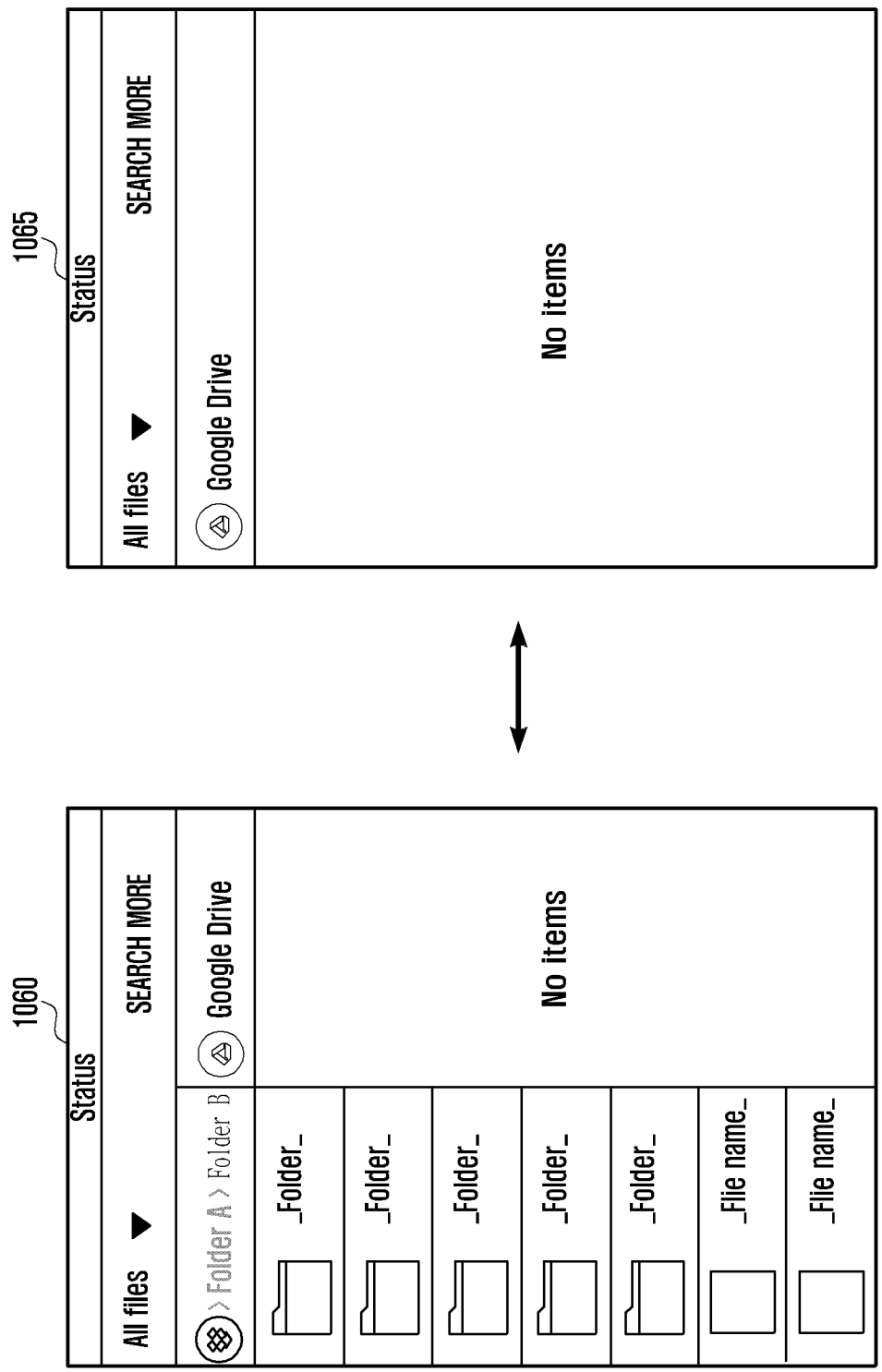

FIG. 10D

METHOD OF DISPLAYING CONTENT AND ELECTRONIC DEVICE ADAPTED TO THE SAME

CROSS-REFERENCE TO RELATED APPLICATION

This application is based on and claims priority under 35 U.S.C. § 119 to Korean Patent Application Serial Number 10-2016-0096440 filed on Jul. 28, 2016, in the Korean Intellectual Property Office, the content of which is incorporated by reference herein in its entirety.

BACKGROUND

1. Field

The present disclosure relates generally to a method of displaying content, and an electronic device adapted to the method.

2. Description of Related Art

Electronic devices are capable of storing various types of information in various file formats. For example, electronic devices are capable of storing information in various file formats, such as image, video, music, word, etc., in their storage devices (e.g., memory, etc.). Storage devices built in an electronic device may be limited in capacity, and thus needs to store data within its capacity. In order to overcome the limit, cloud services that allow user to store various types of content, such as photos, documents, moving images, etc. in a server are attracted.

In order to use cloud services, electronic devices need to execute an application provided by a specific cloud service. The application is capable of providing only data regarding content stored in a specific cloud server. Therefore, if data that a user needs is stored in different cloud servers, the user needs to execute a number of applications corresponding to the different cloud services. This makes it difficult for users to access necessary data.

SUMMARY

The present disclosure addresses the above problems and disadvantages, and provides at least the advantages described below. Accordingly, an example aspect of the present disclosure provides a method of displaying content, and an electronic device adapted to the method.

In accordance with an example aspect of the present disclosure, an electronic device is provided. The electronic device includes: a communication module comprising communication circuitry; a display; a memory for storing information regarding at least one piece of content; and a processor. The processor is configured to register a number of cloud servers to obtain at least one piece of content stored in the cloud servers and to divide the obtained content into areas, based on the cloud servers, and to display the divided areas on a screen.

In accordance with another example aspect of the present disclosure, a method of displaying content of an electronic device is provided. The method includes: registering a number of cloud servers; obtaining at least one piece of content stored in the cloud servers; dividing the obtained content into areas, based on the cloud servers; and displaying the divided areas on a screen.

BRIEF DESCRIPTION OF THE DRAWINGS

The above and other aspects, features and attendant advantages of the present disclosure will be more apparent and readily appreciated from the following detailed description, taken in conjunction with the accompanying drawings, in which like reference numerals refer to like elements, and wherein:

FIGS. 10A, 10B, 100 and 10D are diagrams illustrating various example screens which can be provided by a cloud manager according to various example embodiments of the present disclosure;

DETAILED DESCRIPTION

Figure 1:
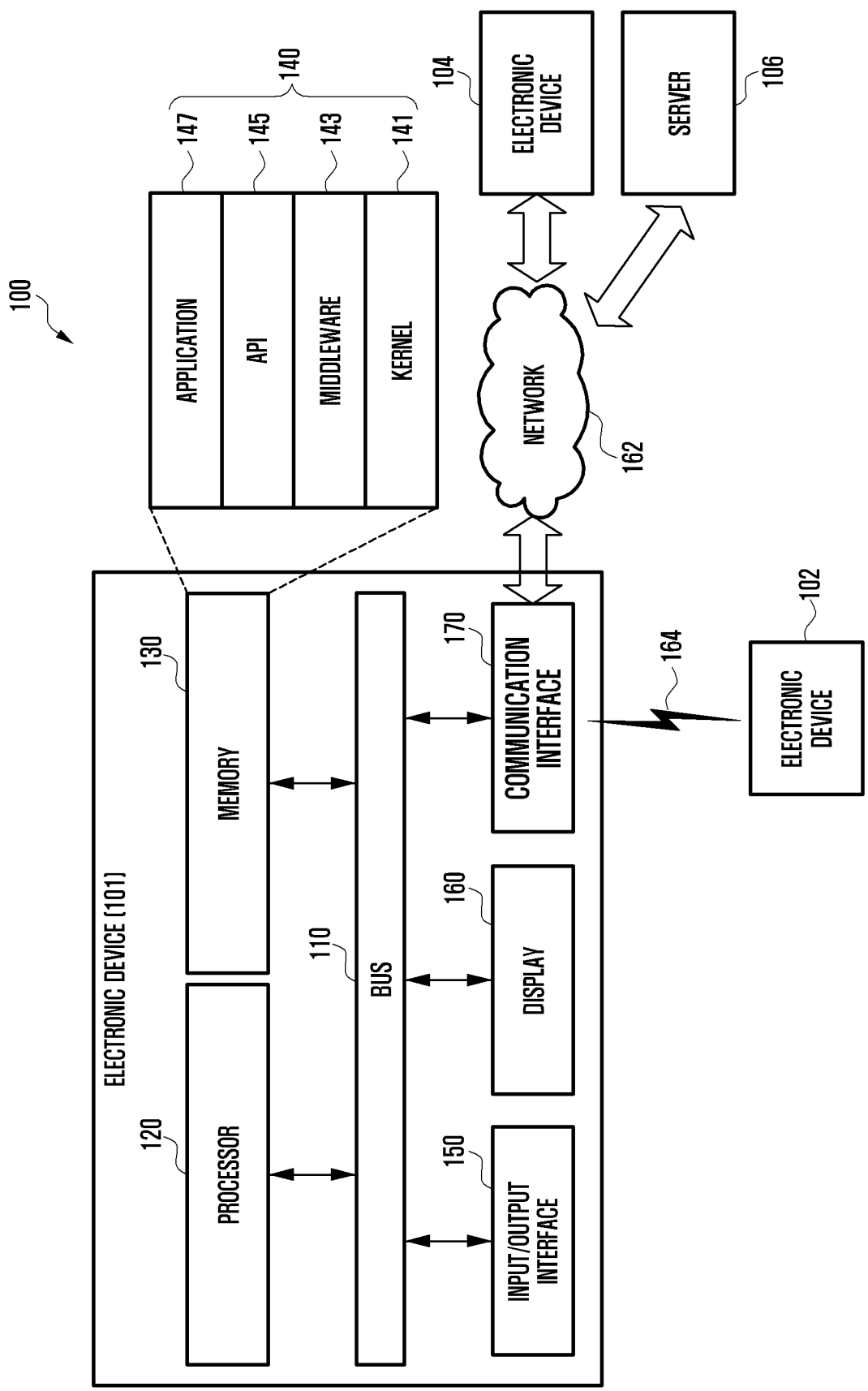
FIG. 1 is a diagram illustrating an example network environment including an electronic device according to various example embodiments of the present disclosure.

Hereinafter, various example embodiments of the present disclosure are described in greater detail with reference to the accompanying drawings. While the present disclosure may be embodied in many different forms, specific embodiments of the present disclosure are shown in drawings and are described herein in detail, with the understanding that the present disclosure is not to be considered to be limited thereto. The same reference numerals are used throughout the drawings to refer to the same or like parts.

An expression "comprising" or "may comprise" used in the present disclosure indicates presence of a corresponding function, operation, or element and does not limit an additional at least one function, operation, or element. The term "comprise" or "have" used herein indicates presence of a characteristic, numeral, step, operation, element, component, or combination thereof described in the disclosure and does not exclude presence or addition of at least one other characteristic, numeral, step, operation, element, component, or combination thereof.

In the present disclosure, the term "or" includes any combination or the entire combination of together listed words. For example, "A or B" may include A, B, or A and B.

Expressions such as "a first" and "a second" in the present disclosure may represent various elements of the present disclosure, but do not limit corresponding elements, e.g., do not limit order and/or importance of corresponding elements, but may be used for distinguishing one element from another element. For example, both a first user device and a second user device are user devices and represent different user devices. For example, a first element may be referred to as a second element without deviating from the scope of the present disclosure, and similarly, a second element may be referred to as a first element.

When it is described that a first element is "coupled" to another element, such as a second element, the first element may be "directly coupled" to the second element or "electrically coupled" to the second element through a third element. However, when it is described that a first element is "directly coupled" to a second element, no third element may exist between the first and second elements.

Terms used in the present disclosure are not intended to limit the present disclosure but to illustrate embodiments of the present disclosure. When using in a description of the present disclosure and the appended claims, a singular form includes a plurality of forms unless it is explicitly differently represented.

Unless differently defined, terms including a technical term and a scientific term used herein have the same meaning as may be generally understood by a person of common skill in the art. It should be understood that generally using terms defined in a dictionary have a meaning corresponding to that of a context of related technology and are not understood to have an ideal or excessively formal meaning unless explicitly defined.

In this disclosure, an electronic device may have a communication function. For example, an electronic device may, for example, and without limitation, be a smart phone, a tablet PC, a mobile phone, a video phone, an e-book reader, a desktop PC, a laptop PC, a netbook computer, a PDA (personal digital assistant), a PMP (portable multimedia player), an MP3 player, a portable medical device, a digital camera, or a wearable device, such as an HMD (head-mounted device) in the form of electronic glasses, electronic clothes, an electronic bracelet, an electronic necklace, an electronic appcessory, or a smart watch, or the like.

According to some example embodiments, an electronic device may be a smart home appliance that involves a communication function, such as a TV (television), a DVD (digital video disk) player, audio equipment, a refrigerator, an air conditioner, a vacuum cleaner, an oven, a microwave, a washing machine, an air cleaner, a set-top box, a TV box, such as Samsung HomeSync™, Apple TV™, and Google TV™, a game console, an electronic dictionary, an electronic key, a camcorder, or an electronic picture frame, or the like, but is not limited thereto.

According to some example embodiments, an electronic device may be a medical device, such as MRA (magnetic resonance angiography), MRI (magnetic resonance imaging), CT (computed tomography), and ultrasonography, a navigation device, a GPS (global positioning system) receiver, an EDR (event data recorder), an FDR (flight data recorder), a car infotainment device, electronic equipment for ship, such as a marine navigation system or a gyrocompass), avionics, security equipment, or an industrial or home robot, or the like, but is not limited thereto.

According to some example embodiments, an electronic device may be furniture or part of a building or construction having a communication function, an electronic board, an electronic signature receiving device, a projector, or various measuring instruments, such as a water, electric, gas, or a wave meter, or the like, but is not limited thereto. An electronic device disclosed herein may be one of the above-mentioned devices or any combination thereof. As well understood by those skilled in the art, the above-mentioned electronic devices are not to be considered as a limitation of the present disclosure.

According to example embodiments, the electronic device may control the activation of a second sensor, based on a signal received through a first sensor, which reduces power consumption of the electronic device compared to a conventional device, in which the second sensor is always activated. The electronic device according to embodiments of the present disclosure may perform a predefined function in response to the signal received through the second sensor.

FIG. 1 is a block diagram illustrating an example electronic apparatus in a network environment 100 according to an example embodiment of the present disclosure.

Referring to FIG. 1, the electronic device 101 may include a bus 110, a processor (e.g., including processing circuitry) 120, a memory 130, an input/output interface (e.g., including input/output circuitry) 150, a display 160, and a communication interface (e.g., including communication circuitry) 170.

The bus 110 may be a circuit for interconnecting elements of the electronic device 101 and for allowing a communication, such as by transferring a control message, between the elements.

The processor 120 may include various processing circuitry that can receive commands from the memory 130, the input/output interface 150, the display 160, and the communication interface 170, through the bus 110, can decipher the received commands, and perform operations and/or data processing according to the deciphered commands.

The memory 130 can store commands received from the processor 120 and/or other elements, and/or commands and/or data generated by the processor 120 and/or other elements. The memory 130 may include software and/or programs 140, such as a kernel 141, middleware 143, an application programming interface (API) 145, and an application 147. Each of the programming modules described above may be configured by software, firmware, hardware, and/or combinations of at least two thereof.

The kernel 141 can control and/or manage system resources used for execution of operations and/or functions implemented in other programming modules, such as the middleware 143, the API 145, and/or the applications 147, and can provide an interface through which the middleware 143, the API 145, and/or the applications 147 can access and then control and/or manage an individual element of the electronic apparatus 100.

The middleware 143 can perform a relay function which allows the API 145 and/or the applications 147 to communicate with and exchange data with the kernel 141. In relation to operation requests received from at least one of applications 147, the middleware 143 can perform load balancing in relation to the operation requests by giving a priority in using a system resource, e.g. the bus 110, the processor 120, and/or the memory 130, of the electronic apparatus 100 to at least one application from among the at least one of the applications 147.

The API 145 is an interface through which the applications 147 can control a function provided by the kernel 141 and/or the middleware 143, and may include at least one interface or function for file control, window control, image processing, and/or character control.

The input/output interface 150 may include various input/output circuitry that can receive a command and/or data from a user, and transfer the received command and/or data to the processor 120 and/or the memory 130 through the bus 110. The display 160 can display an image, a video, and/or data to a user.

The communication interface 170 may include various communication circuitry that can establish a communication between the electronic apparatus 100 and another electronic devices 102 and 104 and/or a server 164, and can support short range communication protocols, e.g. a wireless fidelity (WiFi) protocol, a BlueTooth (BT) protocol, and a near field communication (NFC) protocol, communication networks, e.g. Internet, local area network (LAN), wide area network (WAN), a telecommunication network, a cellular network, and a satellite network, a plain old telephone service (POTS), or any other similar and/or suitable communication networks, such as network 162. Additionally or alternatively, the communication interface 170 may establish a short-range communication connection 164 with another device (e.g., electronic device 102). Each of the electronic devices 102 and 104 may be the same type or different types of electronic devices.

Figure 2:
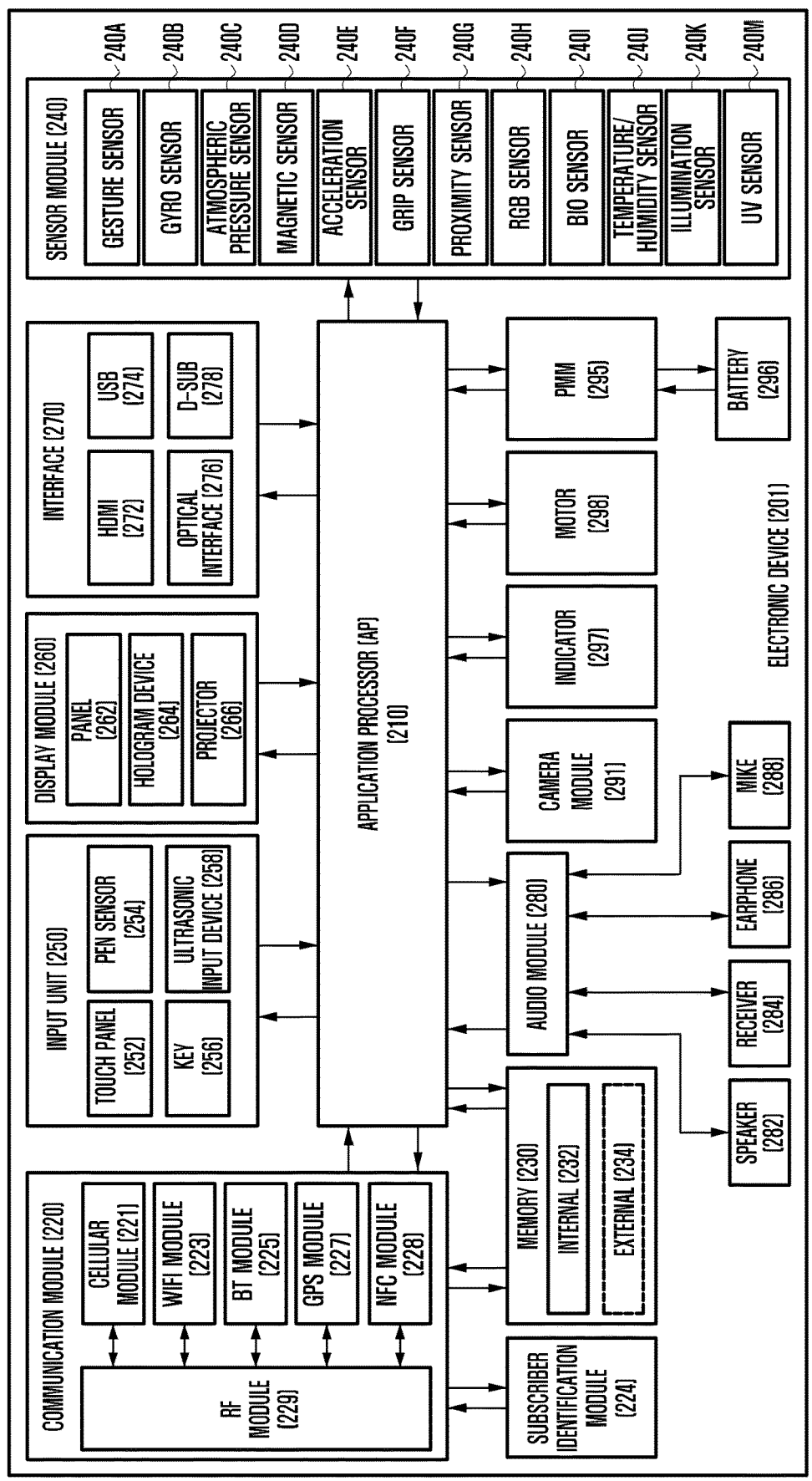
FIG. 2 is a block diagram illustrating an example electronic device according to various example embodiments of the present disclosure.

FIG. 2 is a block diagram illustrating an example electronic device 201 in accordance with an example embodiment of the present disclosure. The electronic device 201 may form all or part of the electronic device 101 illustrated in FIG. 1.

Referring to FIG. 2, the electronic device 201 may include at least one application processor (AP) (e.g., including processing circuitry) 210, a communication module (e.g., including communication circuitry) 220, a subscriber identification module (SIM) card 224, a memory 230, a sensor module 240, an input unit (e.g., including input circuitry) 250, a display 260, an interface (e.g., including interface circuitry) 270, an audio module 280, a camera module 291, a power management module 295, a battery 296, an indicator 297, and a motor 298.

The AP 210 may include various processing circuitry and drive an operating system or applications, control a plurality of hardware or software components connected thereto, and also perform processing and operation for various data including multimedia data. The AP 210 may be formed of a system-on-chip (SoC), and may further include a graphic processing unit (GPU).

The communication module 220 may perform a data communication with any other electronic device connected to the electronic device 201 through the network. According to an example embodiment, the communication module 220 may include various communication circuitry therein, such as, for example, and without limitation, one or more of a cellular module 221, a WiFi module 223, a BT module 225, a GPS module 227, an NFC module 228, and an RF (radio frequency) module 229.

The cellular module 221 may offer a voice call, a video call, a message service, or an Internet service through a communication network, such as long term evolution (LTE), LTE-advanced (LTE-A), code division multiple access (CDMA), wideband CDMA (WCDMA), universal mobile telecommunications system (UMTS), WiBro, or global system for mobile communication (GSM). Additionally, the cellular module 221 may perform identification and authentication of the electronic device in the communication network, using the SIM card 224. According to an embodiment, the cellular module 221 may perform at least part of functions the AP 210 can provide, such as a multimedia control function.

According to an embodiment, the cellular module 221 may include a communication processor (CP), and may be formed of an SoC, for example. Although some elements such as the cellular module 221, such as the CP, the memory 230, or the power management module 295 are shown as separate elements being different from the AP 210 in FIG. 2, the AP 210 may be formed to have at least part of the above elements in an embodiment of the present disclosure.

According to an embodiment, the AP 210 or the cellular module 221 may load commands or data, received from a nonvolatile memory connected thereto or from at least one of the other elements, into a volatile memory to process them. Additionally, the AP 210 or the cellular module 221 may store data, received from or created at one or more of the other elements, in the nonvolatile memory.

Each of the WiFi module 223, the BT module 225, the GPS module 227 and the NFC module 228 may include a processor for processing data transmitted or received therethrough. Although FIG. 2 illustrates the cellular module 221, the WiFi module 223, the BT module 225, the GPS module 227 and the NFC module 228 as different blocks, at least two of these modules may be contained in a single IC (integrated circuit) chip or a single IC package, e.g., may be formed as a single SoC.

The RF module 229 may transmit and receive RF signals or any other electric signals, and may include a transceiver, a PAM (power amp module), a frequency filter, or an LNA (low noise amplifier). The RF module 229 may further include any component, e.g., a wire or a conductor, for transmission of electromagnetic waves in a free air space. Although FIG. 2 illustrates that the cellular module 221, the WiFi module 223, the BT module 225, the GPS module 227 and the NFC module 228 share the RF module 229, at least one of these modules may perform transmission and reception of RF signals through a separate RF module in an embodiment of the present disclosure.

The SIM card 224 may be a specific card formed of SIM and may be inserted into a slot formed at a certain location of the electronic device. The SIM card 224 may contain therein an ICCID (integrated circuit card identifier) or an IMSI (international mobile subscriber identity).

The memory 230 may include an internal memory 232 and/or an external memory 234. The internal memory 232 may include at least one of a volatile memory, such as DRAM (dynamic random access memory), SRAM (static RAM), SDRAM (synchronous DRAM), or a nonvolatile memory, such as OTPROM (one time programmable read-only memory), PROM (programmable ROM), EPROM (erasable and programmable ROM), EEPROM (electrically erasable and programmable ROM), mask ROM, flash ROM, NAND flash memory, and NOR flash memory.

According to an example embodiment, the internal memory 232 may have the form of an SSD (solid state drive). The external memory 234 may include a flash drive, e.g., CF (compact flash), SD (secure digital), Micro-SD (micro secure digital), Mini-SD (mini secure digital), xD (extreme digital), or memory stick, and may be functionally connected to the electronic device 201 through various interfaces. The electronic device 201 may further include a storage device or medium such as a hard drive.

The sensor module 240 may measure physical quantity or sense an operating status of the electronic device 201, and then convert measured or sensed information into electrical signals. The sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H, such as an RGB (red, green, blue) sensor, a biometric (e.g., bio) sensor 240I, a temperature-humidity sensor 240J, an illumination sensor 240K, and a UV (ultraviolet) sensor 240M. Additionally or alternatively, the sensor module 240 may include an E-nose sensor, an EMG (electromyography) sensor, an EEG (electroencephalogram) sensor, an ECG (electrocardiogram) sensor, an IR (infrared) sensor, an iris scan sensor, or a finger scan sensor. The sensor module 240 may include a control circuit for controlling one or more sensors equipped therein.

The input unit 250 may include various input circuitry, such as, for example, and without limitation, a touch panel 252, a digital pen sensor 254, a key 256, or an ultrasonic input device 258. The touch panel 252 may recognize a touch input in a capacitive, resistive, infrared, or ultrasonic type manner. The touch panel 252 may further include a control circuit. In case of a capacitive type, a physical contact or proximity may be recognized. The touch panel 252 may further include a tactile layer that offers a tactile feedback to a user.

The digital pen sensor 254 may be formed in the same or similar manner as receiving a touch input or by using a separate recognition sheet. The key 256 may include a physical button, an optical key, or a keypad. The ultrasonic input device 258 is capable of identifying data by sensing sound waves with a microphone (MIC) 288 in the electronic device 201 through an input tool that generates ultrasonic signals, thus allowing wireless recognition. According to an embodiment, the electronic device 201 may receive a user input from any external device connected thereto through the communication module 220.

The display 260 may include a panel 262, a hologram device 264, or a projector 266. The panel 262 may be LCD (liquid crystal display), or AM-OLED (active matrix organic light emitting diode) may have a flexible, transparent or wearable form, and may be formed of a single module with the touch panel 252. The hologram device 264 may project a stereoscopic image in the air using interference of light. The projector 266 may project an image onto a screen, which may be located at the inside or outside of the electronic device 201. According to an embodiment, the display 260 may further include a control circuit for controlling the panel 262, the hologram device 264, and the projector 266.

The interface 270 may include various interface circuitry, such as, for example, and without limitation, an HDMI (high-definition multimedia interface) 272, a USB (universal serial bus) 274, an optical interface 276, and a D-sub (d-subminiature) 278, and may be contained in the communication interface 160 shown in FIG. 1. Additionally or alternatively, the interface 270 may include an MHL (mobile high-definition link) interface, an SD (secure digital) card/MMC (multi-media card) interface, or an IrDA (infrared data association) interface.

The audio module 280 may perform a conversion between sounds and electric signals. At least part of the audio module 280 may be contained in the input/output interface 140 shown in FIG. 1. The audio module 280 may process sound information inputted or outputted through a speaker 282, a receiver 284, an earphone 286, or the MIC 288.

The camera module 291 is capable of obtaining still images and moving images, and may include at least one image sensor, such as a front sensor or a rear sensor, a lens, an ISP (image signal processor, or a flash, such as LED or xenon lamp.

The power management module 295 may manage electric power of the electronic device 201 and may include a PMIC (power management integrated circuit), a charger IC, or a battery gauge.

The PMIC may be formed of an IC chip or SoC. Charging may be performed in a wired or wireless manner. The charger IC may charge a battery 296 and prevent overvoltage or overcurrent from a charger. According to an embodiment, the charger IC may have a charger IC used for at least one of wired and wireless charging types. A wireless charging type may include a magnetic resonance type, a magnetic induction type, or an electromagnetic type. Any additional circuit for a wireless charging may be further used, such as a coil loop, a resonance circuit, or a rectifier.

The battery gauge may measure the residual amount of the battery 296 and a voltage, current or temperature in a charging process. The battery 296 may store or create electric power therein and supply electric power to the electronic device 201. The battery 296 may be a rechargeable or solar battery.

The indicator 297 may illustrate thereon a current status, such as a booting, message, or recharging status of part or all of the electronic device 201. The motor 298 may convert an electric signal into a mechanical vibration. The electronic device 201 may include a specific processor, such as GPU, for supporting a mobile TV. This processor may process media data that comply with standards of DMB (digital multimedia broadcasting), DVB (digital video broadcasting), or media flow.

Each of the above-discussed elements of the electronic device disclosed herein may be formed of one or more components, and may have various names according to the type of the electronic device. The electronic device disclosed herein may be formed of at least one of the above-discussed elements without some elements or with additional elements. Some of the elements may be integrated into a single entity that still performs the same functions as those of such elements before integrated.

Figure 3:
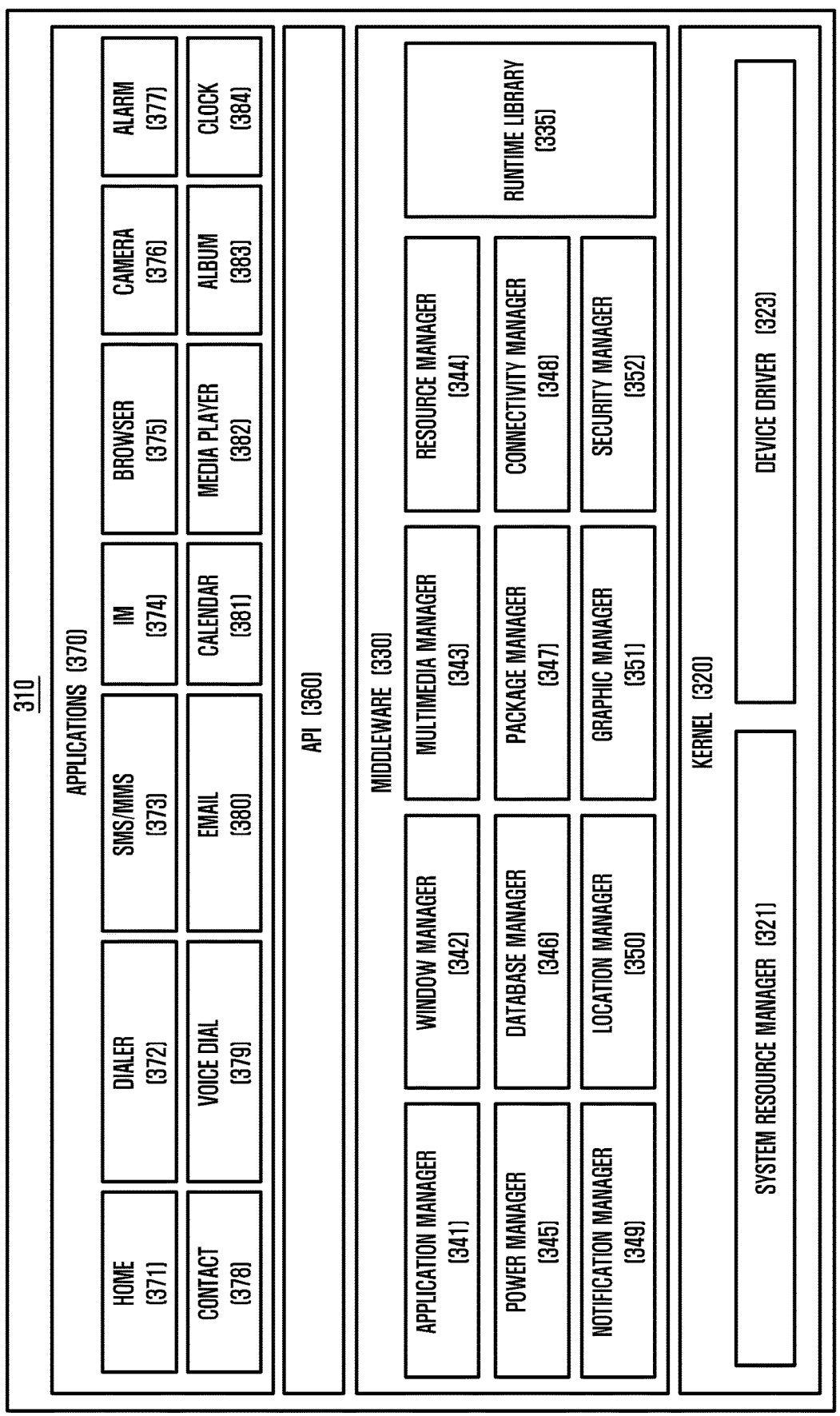
FIG. 3 is a block diagram illustrating an example program module according to various example embodiments of the present disclosure.

FIG. 3 is a block diagram illustrating an example configuration of a programming module 310 according to an example embodiment of the present disclosure.

The programming module 310 may be stored in the electronic device 100 or may be stored in the electronic device 201 illustrated in FIG. 2. At least a part of the programming module 310 may be implemented in software, firmware, hardware, or a combination of two or more thereof. The programming module 310 may be implemented in hardware 201, and may include an OS controlling resources related to an electronic device and/or various applications 370 executed in the OS. For example, the OS may be Android, iOS, Windows, Symbian, Tizen, or Bada.

Referring to FIG. 3, the programming module 310 may include a kernel 320, middleware 330, an API 360, and/or applications 370.

The kernel 320 may include a system resource manager 321 and/or a device driver 323. The system resource manager 321 may include a process manager, a memory manager, and a file system manager. The system resource manager 321 may perform the control, allocation, or recovery of system resources. The device driver 323 may include a display driver, a camera driver, a Bluetooth driver, a shared memory driver, a USB driver, a keypad driver, a Wi-Fi driver, and/or an audio driver, and may further include an inter-process communication (IPC) driver.

The middleware 330 may include multiple modules previously implemented so as to provide a function used in common by the applications 370, and may provide a function to the applications 370 through the API 360 in order to enable the applications 370 to efficiently use limited system resources within the electronic device. For example, as illustrated in FIG. 3, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include a library module used by a complier, in order to add a new function by using a programming language during the execution of the applications 370, and may perform functions which are related to input and output, the management of a memory, or an arithmetic function.

The application manager 341 may manage a life cycle of at least one of the applications 370. The window manager 342 may manage GUI resources used on the screen. The multimedia manager 343 may detect a format used to reproduce various media files and may encode or decode a media file through a codec appropriate for the relevant format. The resource manager 344 may manage resources, such as a source code, a memory, or a storage space, of at least one of the applications 370.

The power manager 345 may operate together with a basic input/output system (BIOS), may manage a battery or power, and may provide power information used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as Wi-Fi and Bluetooth. The notification manager 349 may display or report, to the user, an event such as an arrival message, an appointment, or a proximity alarm, in such a manner as not to disturb the user. The location manager 350 may manage location information of the electronic device. The graphics manager 351 may manage graphic effects, which are to be provided to the user, and/or a user interface related to the graphic effects. The security manager 352 may provide various security functions used for system security and user authentication. According to an embodiment of the present disclosure, when the electronic device has a telephone function, the middleware 330 may further include a telephony manager for managing a voice and/or video telephony call function of the electronic device.

The middleware 330 may generate and use new middleware module through various functional combinations of the above-described internal element modules, may provide modules specialized according to types of OSs in order to provide differentiated functions, and may dynamically delete some of the existing elements, or may add new elements. Accordingly, the middleware 330 may omit some of the elements described in the embodiments of the present disclosure, may further include other elements, or may replace the some of the elements with elements, each of which performing a similar function and having a different name.

The API 360 is a set of API programming functions, and may be provided with a different configuration according to an OS. In the case of Android or iOS, for example, one API set may be provided to each platform. In the case of Tizen, two or more API sets may be provided to each platform.

The applications 370 may include a preloaded application and/or a third party application, and may include a home 371, dialer 372, a short message service (SMS)/multimedia messaging service (MMS) 373, instant message (IM) 374, browser 375, camera 376, alarm 377, contact 378, voice dial 379, electronic mail (e-mail) 380, calendar 381, media player 382, album 383, and clock application 384, and any other suitable and/or similar application.

At least a part of the programming module 310 may be implemented by instructions stored in a non-transitory computer-readable storage medium. When the instructions are executed by one or more processors, the one or more processors may perform functions corresponding to the instructions. The non-transitory computer-readable storage medium may be the memory 220. At least a part of the programming module 310 may be executed by the one or more processors 210, and may include a module, a program, a routine, a set of instructions, and/or a process for performing one or more functions.

Figure 4:
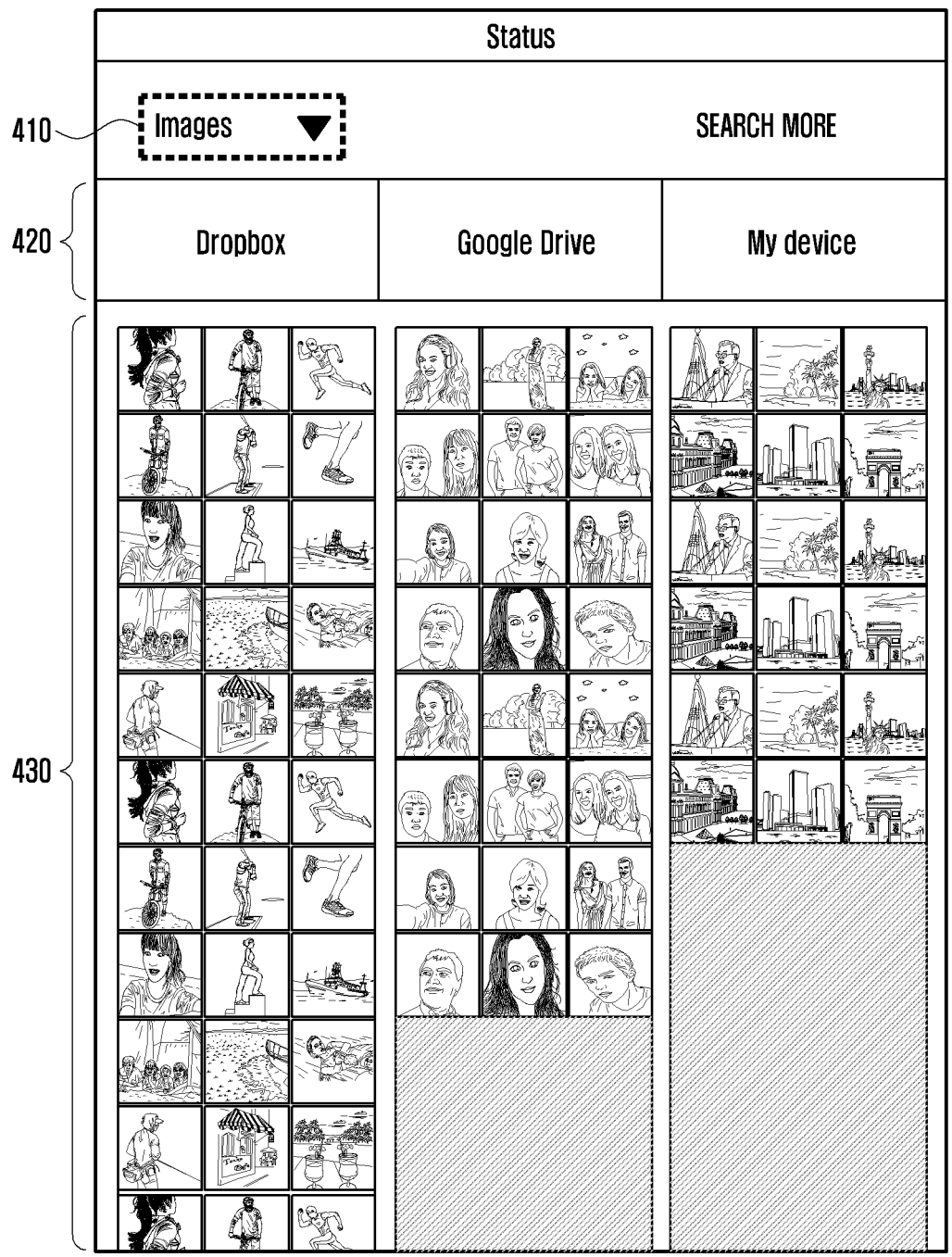
FIG. 4 is a diagram illustrating an example screen of a cloud manager according to various example embodiments of the present disclosure.

FIG. 4 is a diagram illustrating an example screen of a cloud manager according to various example embodiments of the present disclosure.

With reference to FIG. 4, an electronic device 101 is capable of executing a cloud manager and displaying a screen related to the cloud manager via a display 160. For example, the electronic device 101 is capable of providing the user with content, stored in a number of cloud servers (e.g., dropbox, google drive, one drive, etc.), via the cloud manager.

In various example embodiments, the electronic device 101 is capable of distinguishing types of data, which will be displayed for the user on a cloud manager, from each other. For example, the electronic device 101 is capable of displaying an item 410 for selecting types of data to be displayed for a user on a cloud manager. For example, if the item 410 is selected (set) to Images, the electronic device 101 is capable of providing image content stored in a number of cloud servers to the cloud manager.

In various embodiments, the electronic device 101 is capable of displaying names of a number of cloud servers or services in a name 420, individually and respectively. For example, the name 420 shows, by way of example, dropbox, google drive and my device 101, etc., in a cloud manager.

In various embodiments, the electronic device 101 is capable of displaying at least one piece of content 430, stored in a number of cloud servers, individually and respectively, according to corresponding cloud services. The electronic device 101 is capable of determining whether a thumbnail corresponding to content exists. If the electronic device 101 determines that a thumbnail corresponding to content exists, it is capable of displaying the thumbnail. Therefore, the user can intuitively recognize content stored in the cloud server.

Figure 5:
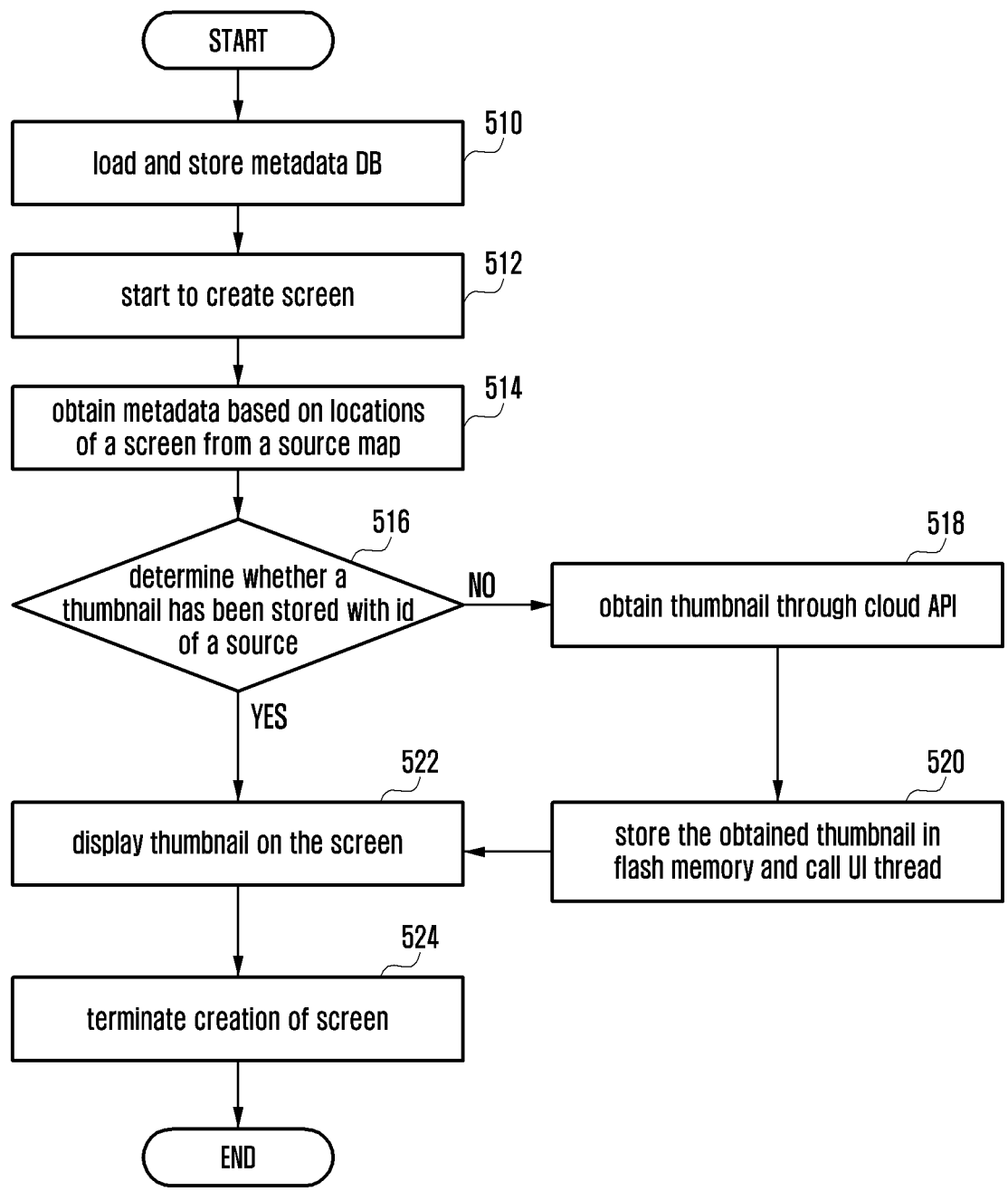
FIG. 5 is a flowchart illustrating an example method of creating a screen of a cloud manager according to various example embodiments of the present disclosure.

FIG. 5 is a flowchart illustrating an example method of creating a screen of a cloud manager according to various example embodiments of the present disclosure.

In various example embodiments, an electronic device 101 is capable of requesting content from a number of cloud servers via its cloud manager, and displaying the content obtained from the cloud servers on the screen. If the number of cloud servers is greater than a preset value, it may not display content of part of the cloud servers on the screen.

In various example embodiments, the cloud manager is capable of executing at least one thread in order to create a screen. In an example embodiment, the thread may be referred to as a unit of flow executed in a program, or a process. For example, the cloud manager may include a user interface (UI) thread, a background thumbnail thread, a metadata sync thread and a thumbnail prefetcher thread.

In various example embodiments, the electronic device 101 is capable of configuring a screen via a UI thread of the cloud manager. The UI thread may configure a screen, based on thumbnails and a metadata database (DB) stored in a storage device (e.g., flash memory), without directly communicating with a cloud server. Therefore, the electronic device 101 is capable of minimizing and/or reducing a wait time until a screen is provided to the user.

In various example embodiments, if a screen needs to be updated, the UI thread calls a metadata sync thread and updates a metadata DB. Alternatively, the UI thread may updates a screen based on the updated metadata DB.

In various embodiments, a metadata DB may include the following elements. For example, a metadata DB may be configured with: id (a content id value which is unique and integrated, and which automatically increases by one), device_id (ids according to types of cloud server, e.g., 1=my device, 2=dropbox, 3=google drive, etc.), source_media_id (unique ID values which are used for cloud servers, and differ from each other according to clouds), date_added (added date information which is the number of seconds elapsed since January the first, 1970), date_modified (modified date information which is the number of seconds elapsed since January the first, 1970), date_taken (taken date information which is the number of seconds elapsed since January the first, 1970), mime_type (type of content), _size (the size of content), _media_type (e.g., image=1, video=2, audio=3, etc.), _full_uri (a uniform resource identifier (URI) of a cloud server storing content information), _thumbnail_uri (an address storing thumbnail information regarding content, e.g., an address of a server), _display_name (a name displayed on a screen, separated from a file name), _parent_cloud_id (a unique ID value of a directory that a corresponding file belongs to in a cloud server), title (file name), and index char (the first alphabet of a file name).

In various example embodiments, with reference to FIG. 5, the electronic device 101 is capable of loading a metadata DB from a storage device, e.g., a flash memory, via a UI thread, and storing the DB in another storage device, e.g., a dynamic random access memory (DRAM), in operation 510. The electronic device 101 is further capable of starting to create a screen in operation 512.

In various example embodiments, the electronic device 101 is capable of fetching metadata based on locations of a screen from a source map via a UI thread in operation 514.

In various example embodiments, the electronic device 101 is capable of determining whether a thumbnail has been stored with metadata (e.g., id) of a source, via a UI thread, in operation 516.

In various example embodiments, if the electronic device ascertains that a thumbnail has been stored with an id of a source in operation 516, it is capable of displaying the thumbnail on the screen via the UI thread in operation 522 and terminating the creation of a screen in operation 524.

In various example embodiments, if the electronic device determines that a thumbnail has not been stored with an id of a source in operation 516, it is capable of obtaining a thumbnail, through an API of a cloud service, via a background thumbnail thread, in operation 518.

In various example embodiments, the electronic device 101 is capable of storing the thumbnail, obtained via the background thumbnail thread, in a storage device (e.g., flash memory) in operation 520. For example, the electronic device 101 is capable of storing the thumbnail, obtained via the background thumbnail thread, with metadata of a source (e.g., thumbnail_uri), and then calling a UI thread. After that, the electronic device 101 is capable of displaying the thumbnail on the screen via a UI thread in operation 522, and the terminating the creation of a screen in operation 524.

Figure 6:
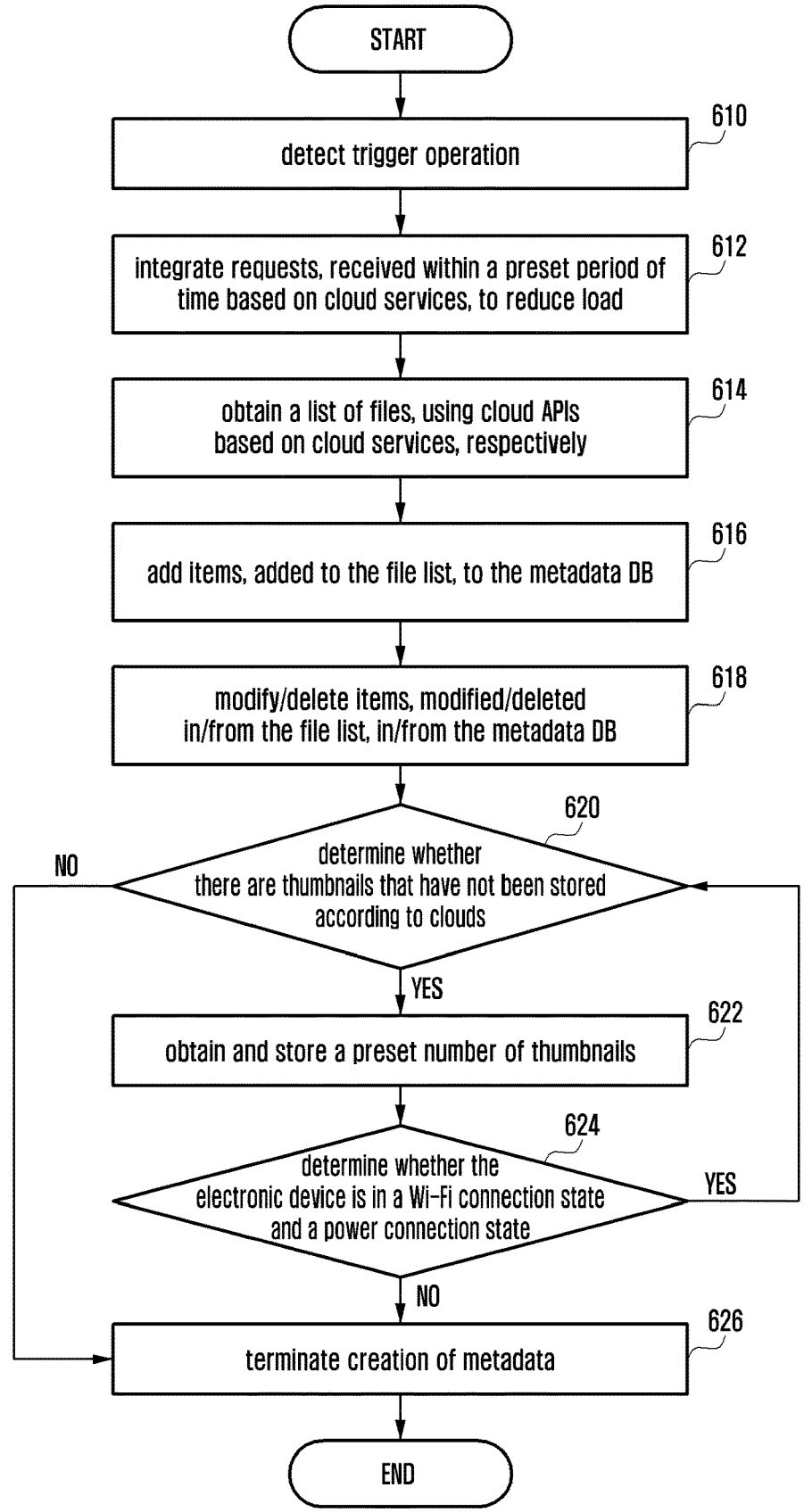
FIG. 6 is a flowchart illustrating an example method of synchronizing a metadata DB of a cloud manager according to various example embodiments of the present disclosure.

FIG. 6 is a flowchart illustrating an example method of synchronizing a metadata DB of a cloud manager according to various example embodiments of the present disclosure.

In various example embodiments, with reference to FIG. 6, an electronic device 101 is capable of detecting a trigger operation for updating a metadata DB in operation 610. For example, the electronic device 101 is capable of updating a metadata DB in response to the detection of an operation for executing an application (e.g., cloud manager), an elapse of a preset time period (e.g., an update period), various operations of an application (e.g., copy, move, delete, lock, etc.), etc. In various embodiments, the electronic device 101 is capable of synchronizing a metadata DB via a metadata sync thread. The metadata sync thread is used to detect content stored in each cloud server at a specific timing point or periodically, to create the content as a metadata DB, to store thumbnails, smaller in size than the original content (e.g., images), in a storage device (e.g., a flash memory).

In various example embodiments, the electronic device 101 integrates requests, received within a preset period of time (e.g., 10 seconds), based on cloud services, via a metadata sync thread, thereby reducing the load, in operation 612.

In various example embodiments, the electronic device 101 is capable of obtaining a list of files, through cloud APIs corresponding to cloud services, respectively, via a metadata sync thread, in operation 614.

In various example embodiments, the electronic device 101 is capable of determining whether the obtained file list has a newly added item, via a metadata sync thread, and adding the newly added item to the metadata DB in operation 616.

In various example embodiments, the electronic device 101 is capable of determining whether the obtained file list has a modified or deleted item, via a metadata sync thread, and modifying or deleting a metadata DB regarding a corresponding item in operation 618.

In various example embodiments, the electronic device 101 is capable of determining whether there are thumbnails that have not been stored according to clouds, via a thumbnail prefetcher thread, in operation 620. For example, if all the thumbnails are stored according to clouds in operation 620, the electronic device 101 is capable of terminating the creating a metadata DB in operation 626.

In various example embodiments, if there are thumbnails that have not been stored according to clouds in operation 620, the electronic device 101 is capable of obtaining and storing a preset number of thumbnails (e.g., 100 thumbnails) via a thumbnail prefetcher thread in operation 622.

In various example embodiments, the electronic device 101 is capable of determining whether it continues to obtain thumbnails, considering a power connection state and/or a Wi-Fi connection state, via a thumbnail prefetcher thread, in operation 624. For example, if the electronic device 101 ascertains that it can obtain thumbnails in an environment where power is supplied to the electronic device and Wi-Fi is connected in operation 624, it returns to operation 620 and determines whether there is a thumbnail that has not been stored. On the other hand, if the electronic device 101 ascertains that it cannot obtain in an environment where power is not supplied to the electronic device and Wi-Fi is not connected in operation 624, it terminates the creation of metadata in operation 626.

Figure 7:
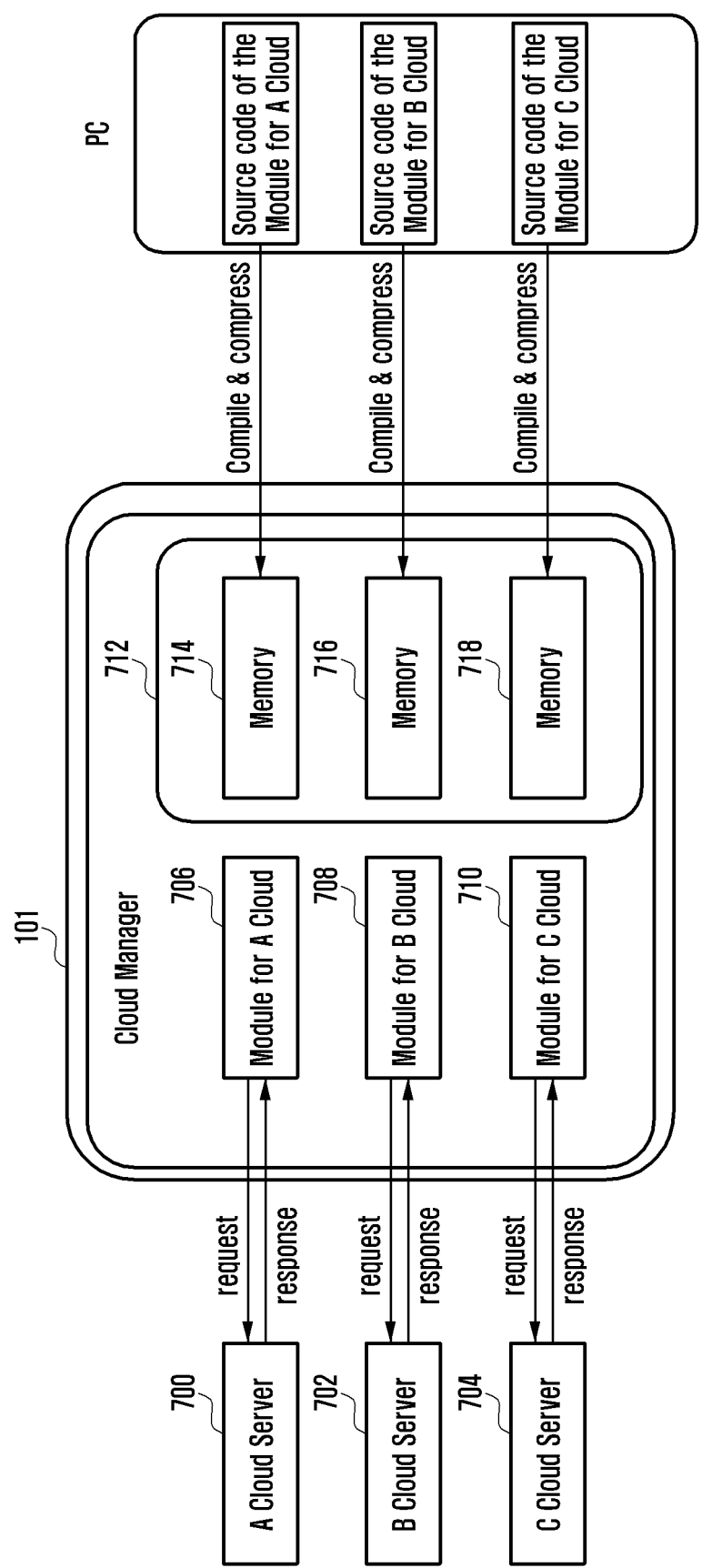
FIG. 7 is a diagram illustrating an example configuration of a cloud manager according to various example embodiments of the present disclosure.

FIG. 7 is a diagram illustrating an example configuration of a cloud manager according to various example embodiments of the present disclosure.

In various example embodiments, the electronic device 101 is capable of communicating with each cloud server via a cloud manager. For example, the cloud manager is capable of performing at least one operation related to data or files (e.g., upload, download, create, delete, modify, etc.), using APIs provided by individual cloud services.

In various embodiments, the electronic device 101 is capable of using APIs provided by individual cloud servers in a cloud manager as follows. For example, independent modules 706, 708, and 710, capable of using APIs corresponding to individual cloud servers 700, 702, and 704, may be implemented based on clouds. The modules may be compiled or compressed in formats which can be used in a cloud manager, respectively, and may be stored in storage units 714, 716, and 718 of a storage space 712 (e.g., a memory) which can be accessed by the cloud manager, respectively.

Figure 8:
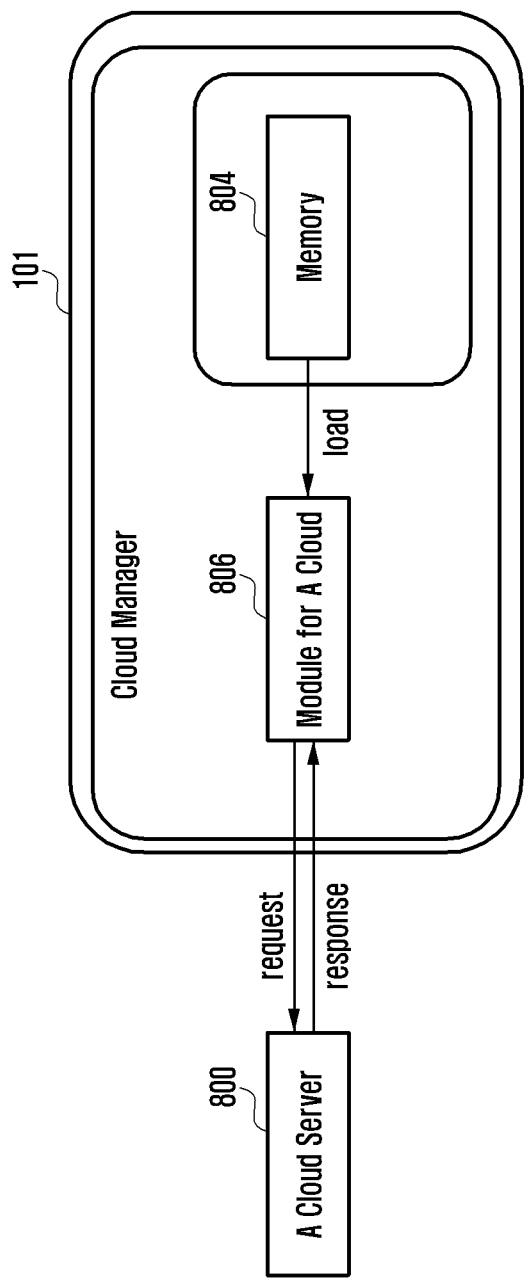
FIG. 8 is a diagram illustrating an example configuration of a module corresponding to an individual cloud server of a cloud manager according to various example embodiments of the present disclosure.

FIG. 8 is a diagram illustrating an example configuration of a module corresponding to an individual cloud server of a cloud manager according to various example embodiments of the present disclosure.

In various example embodiments, the electronic device 101 is capable of reading a module 806 corresponding to a cloud server 800 from a space 804, via a cloud manager, at a timing point that an application is executed, and loading the module 806 on the memory. In various embodiments, the cloud manager may perform the update of a module that has been implemented and the dynamic addition of a new could, without updating the cloud manager. A detailed description is explained, below, with reference to FIG. 9.

Figure 9:
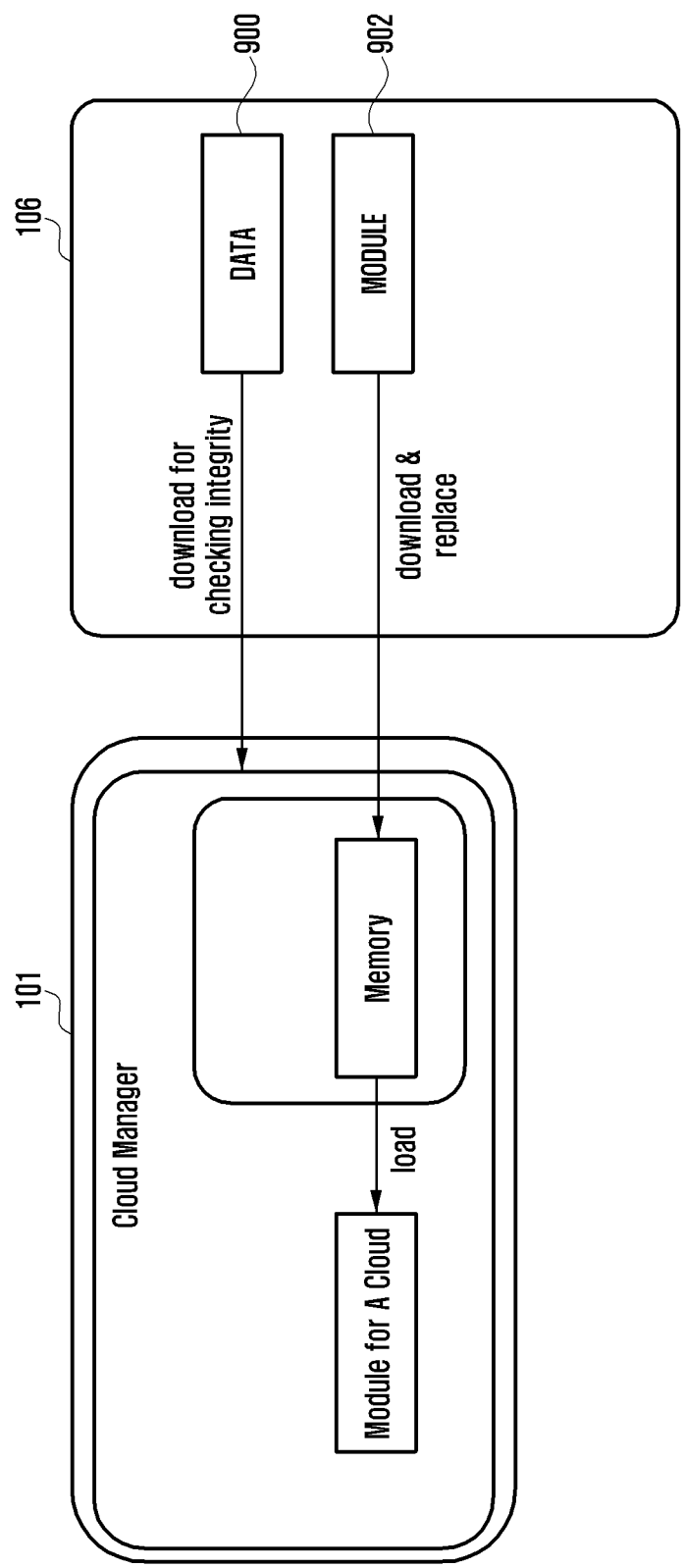
FIG. 9 is a diagram illustrating an example method of updating modules and providing a list of available cloud services in a cloud manager according to various example embodiments of the present disclosure.

FIG. 9 is a diagram illustrating an example method of updating modules and providing a list of available cloud services in a cloud manager according to various example embodiments of the present disclosure.

In various example embodiments, with reference to FIG. 9, a module 902, compiled or compressed to be used by a cloud manager, may be stored in a server 106 which can be accessed via a network, along with data 900 describing metadata regarding a corresponding module. For example, the metadata may include version information regarding a corresponding module, information that a cloud manager uses to check the integrity of a module when the module is downloaded, a list of cloud services which can be provided by a cloud manager, etc. The cloud manager determines whether a module is updated and a new cloud is added, according to a preset policy, and downloads, if a corresponding module is needed, the module via a background service.

In various embodiments, the downloaded module may be replaced with an existing module stored in the electronic device 101. When the cloud manager is executed, the downloaded module is loaded on a memory, thereby performing the update of a module and the addition of a new cloud.

FIGS. 10A, 10B, 100 and 10D are diagrams illustrating various example screens which can be provided by a cloud manager according to various example embodiments of the present disclosure.

Figure 10A:
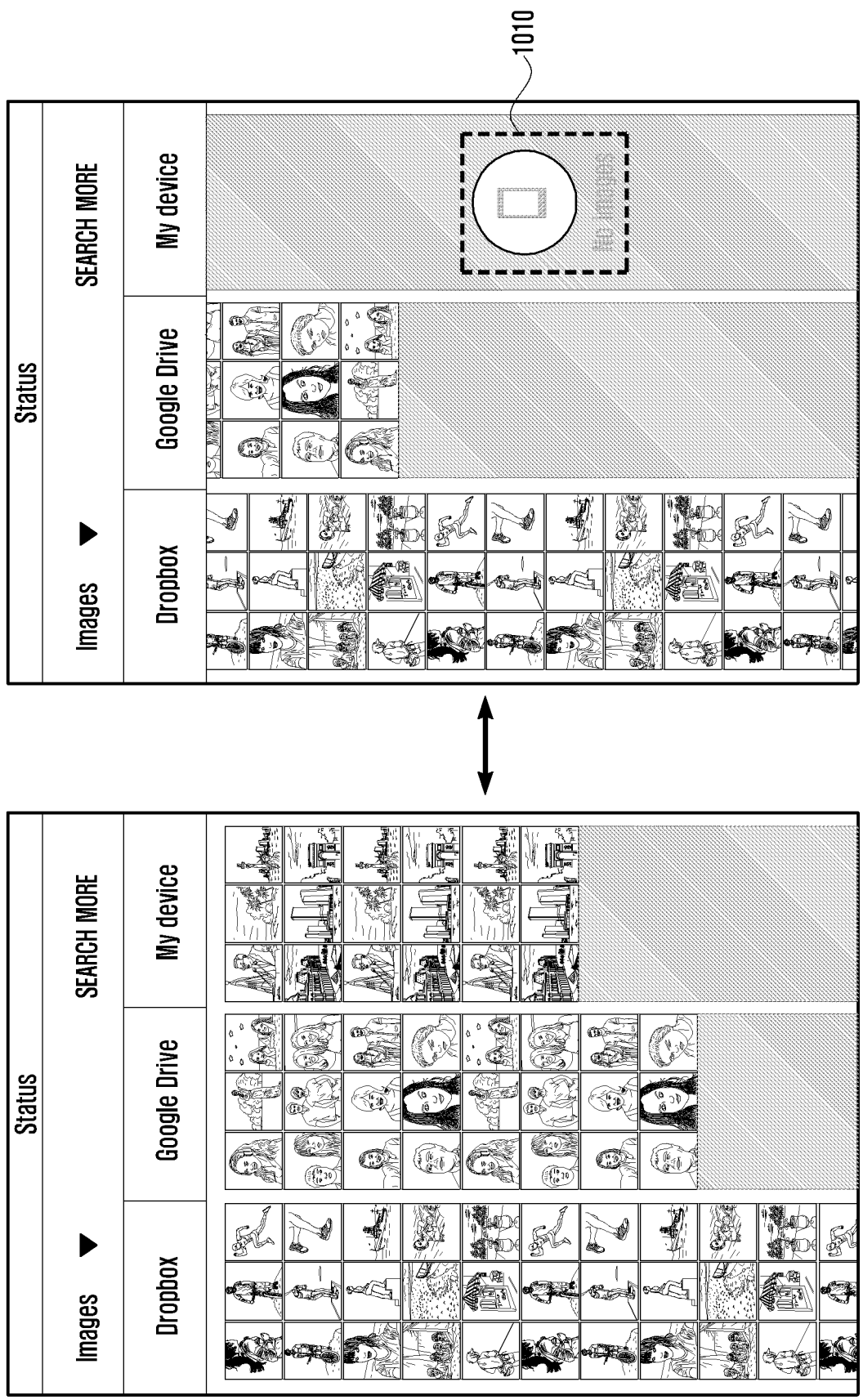

In various example embodiments, with reference to FIG. 10A, an electronic device 101 is capable of displaying at least one piece of content according to sources of the content, via a cloud manager. For example, the electronic device 101 is capable of displaying a first cloud service (e.g., dropbox), a second cloud service (e.g., google drive), and content stored in the electronic device 101, respectively. For example, if a user sets an image to be displayed, the electronic device 101 is capable of displaying thumbnails corresponding to the image, according to sources of the content.

In various example embodiments, the electronic device 101 is capable of receiving a user's scroll input (e.g., a drag input for the display, a button input, etc.), and moving and displaying a thumbnail in response to the scroll input. For example, the electronic device 101 receives a user's input dragging on the screen from the bottom to the top, and scrolls content (e.g., an image or a thumbnail corresponding to the image) in response to the drag input, thereby displaying a thumbnail that has not been shown on the screen.

In various example embodiments, if the number of image files, stored via a first cloud service, is relatively large, content, stored in another source (e.g., electronic device 101), may not be displayed on the screen when the user scrolls down. This is because the number of pieces of content, stored in the source, is relatively small. In this case, the electronic device 101 may display an indication 1010 indicating that content or a thumbnail corresponding to the content does not exist.

Figure 10B:
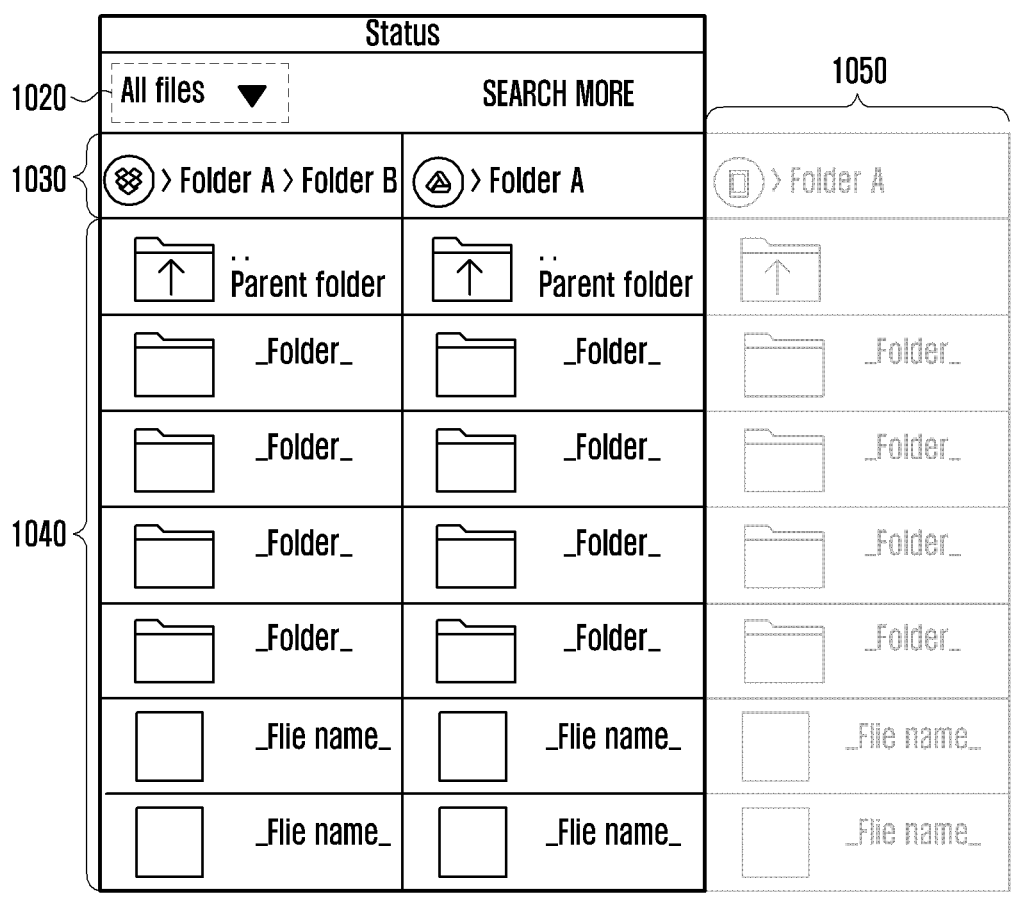

In various example embodiments, with reference to FIG. 10B, the electronic device 101 is capable of displaying an item 1020 for selecting a type of content to be displayed via a cloud manager. For example, the electronic device 101 is capable of receiving a user input for an item 1020, and individually displaying all files, images, videos, documents, music, etc.

In various example embodiments, the electronic device 101 is capable of displaying a source 1030 of content, via a cloud manager. For example, the source 1030 may display information regarding a cloud service or server (e.g., name, icon, etc.), and may also display a path of a file in the cloud server. The electronic device 101 is capable of individually displaying folders according to sources of content and files stored in the folders on an area 1040 of the screen.

In various example embodiments, the electronic device 101 is capable of selecting the number of sources to be displayed once on the screen via a cloud manager. For example, with reference to FIG. 10B, although the electronic device 101 is displaying, on the screen, only content regarding a first cloud manager and a second cloud manager, it may display content 1050 that is stored in the electronic device but has not been shown, according to a user's input (e.g., an input swiping from right to left). In this case, the leftmost area of screen displaying the first cloud manager may disappear from the screen changed in response to the user input.

In various example embodiments, with reference to FIG. 10C, the electronic device 101 is capable of displaying only content stored in a specific source, via a cloud manager. For example, in 1060 of FIG. 10C, the electronic device 101 is capable of receiving a user input selecting a specific source (e.g., an input applied to a specific button input, a tap input applied to a specific source, etc.), and in 1065 of FIG. 10C, the electronic device 101 is capable of displaying content stored in a specific source selected in response to the user input.

Figure 10D:
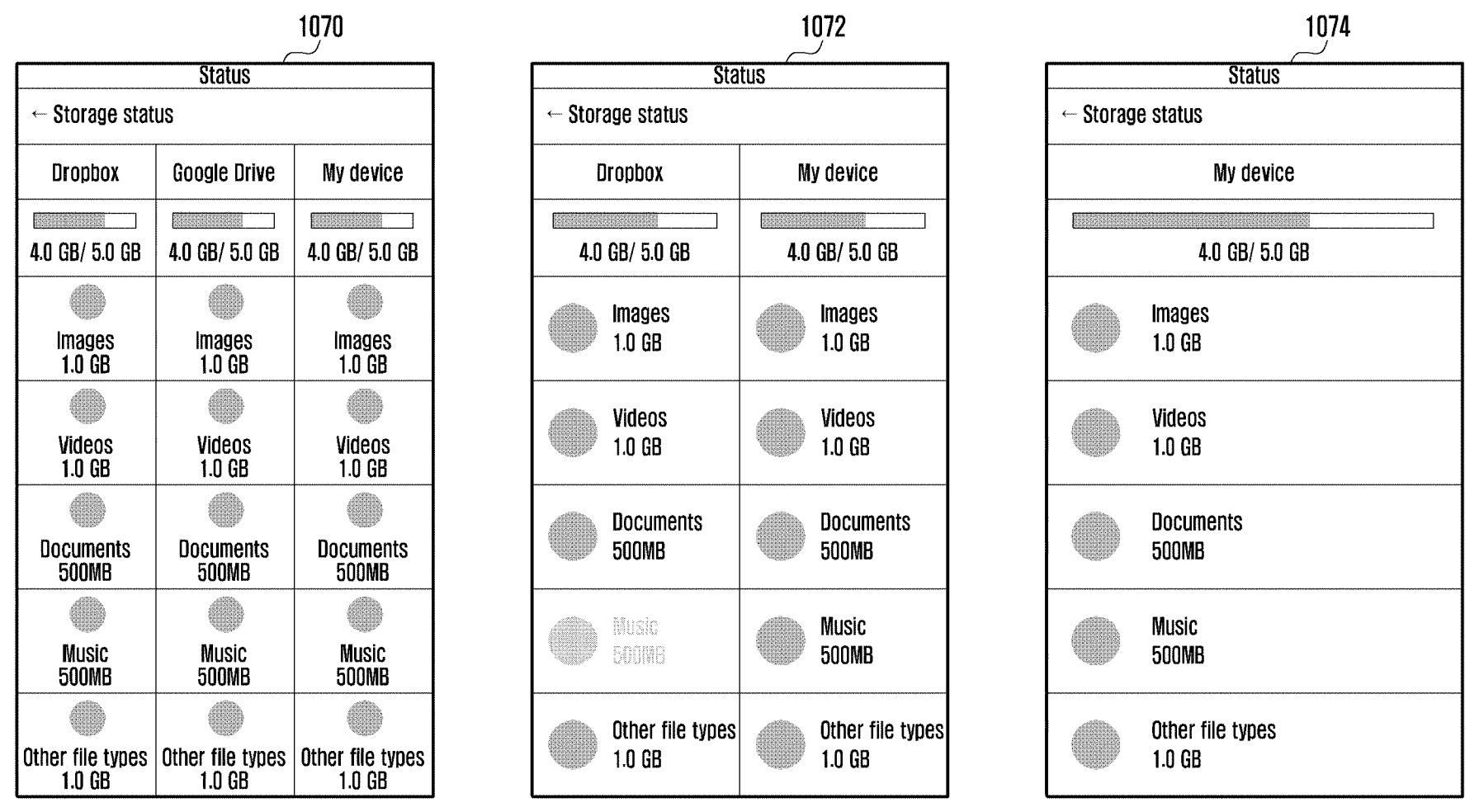

In various example embodiments, with reference to FIG. 10D, the electronic device 101 is capable of displaying size of content stored in individual sources, via a cloud manager. For example, the electronic device is capable of displaying a maximum storage capacity of a first cloud service, 5 GB, and the size of currently stored content, 4 GB. The electronic device is also capable of individually displaying sizes of currently stored content, according to types of content. For example, the electronic device is capable of individually displaying 1 GB as the size of image, 1 GB as the size of video, 500 MB as the size of document, 500 MB as the size of music, and 1 GB as the other.

In various example embodiments, 1070 of FIG. 7D illustrates an example screen showing information regarding a capacity in a state where two different types of cloud servers other than the electronic device 101 are connected to a cloud manager. 1072 of FIG. 7D illustrates an example screen showing information regarding a capacity in a state where one type of cloud server other than the electronic device 101 is connected to a cloud manager. 1074 of FIG. 7D illustrates an example screen showing information regarding a capacity in a state where a cloud server other than the electronic device 101 is not connected to a cloud manager.

Figure 11:
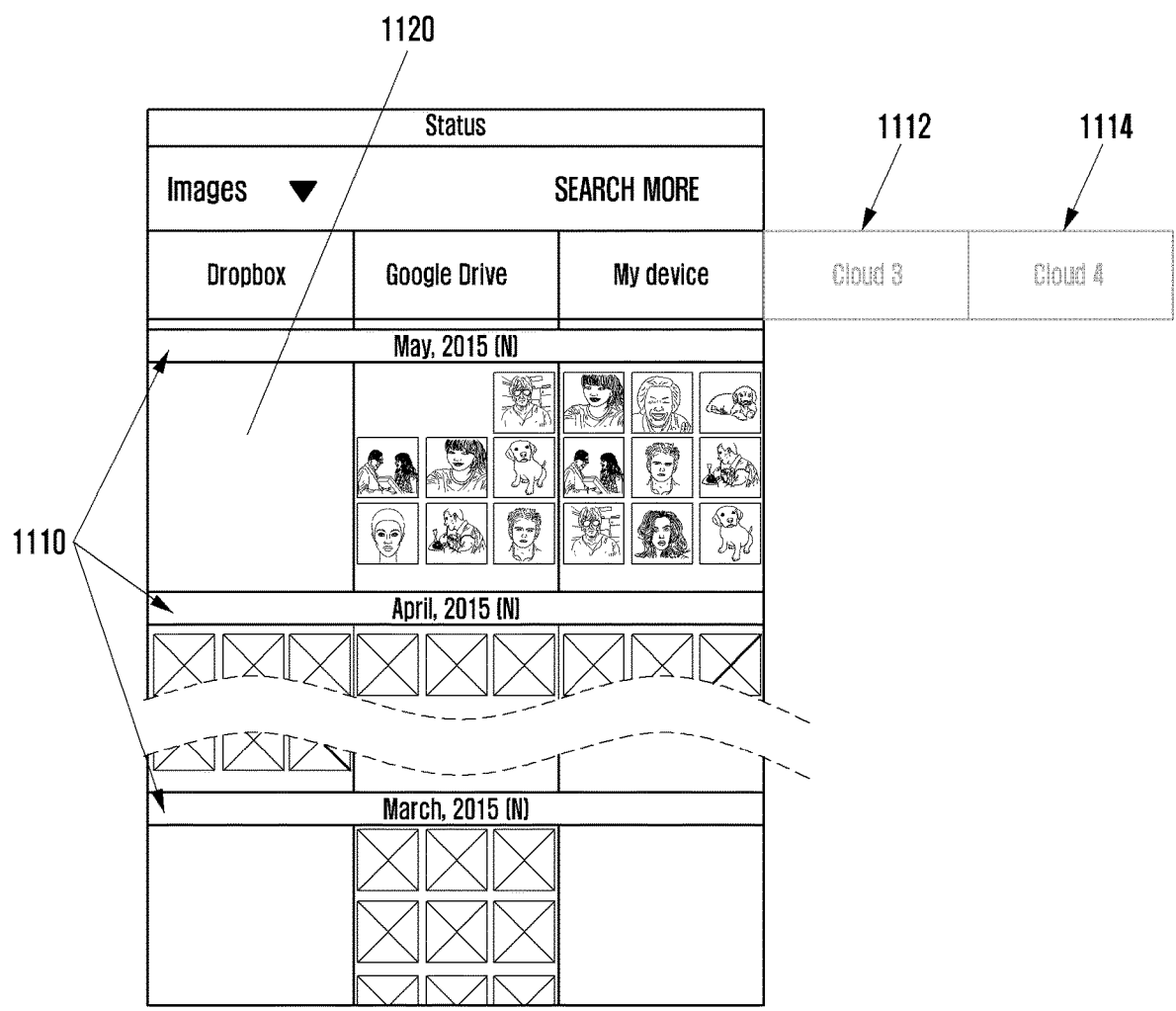
FIG. 11 is a diagram illustrating an example screen on which data stored in different clouds of a cloud manager is arranged, based on date, according to various example embodiments of the present disclosure.

FIG. 11 is a diagram illustrating an example screen on which data stored in different clouds of a cloud manager is arranged, based on date, according to various example embodiments of the present disclosure.

In various example embodiments, with reference to FIG. 11, while displaying a screen on which content is divided based on sources of content (e.g., cloud server), the electronic device 101 is also capable of displaying the screen where content is divided based on another attribute (e.g., date), via a cloud manager. For example, the electronic device 101 is capable of displaying content on the screen based on date 1110, along with month and year as title at the start part of every month. The cloud manager is capable of classifying content based the column (e.g., source of content) and the row (e.g., date related to content, such as, an image taking timing point for images, a writing timing point for documents, a date when content is first registered in a corresponding source, etc.). With reference to FIG. 11, since the electronic device 101 does not have content which is classified based on a first cloud server (e.g., dropbox) and a date (e.g., May, 2015), the electronic device 101 may display a corresponding area 1120 as empty space. Alternatively, the electronic device 101 may display an indication indicating that content has not been stored.

In various example embodiments, the electronic device 101 stores the number of content stored in a source which may vary depending on months. In this case, the electronic device 101 may display, based on a source storing the largest amount of content, content stored in the remaining sources. For example, if a second cloud server has seven photos in May and the electronic device 101 has nine photos in May, the electronic device may display views of the second cloud server by the two photos in visually different form (e.g., a dummy view in grey, a view in empty area, an indication (e.g., X), etc.).

In various example embodiments, with reference to FIG. 11, the cloud manager of the electronic device 101 shows that a third cloud server 1112 and a fourth cloud server 1114 have been registered, as well as the first cloud server (e.g., dropbox) and the second cloud server (e.g., google drive). For example, the third cloud server 1112 and the fourth cloud server 1114 may not be displayed along with the first cloud server and the second cloud server because the number of sources to be displayed is limited.

Figure 12:
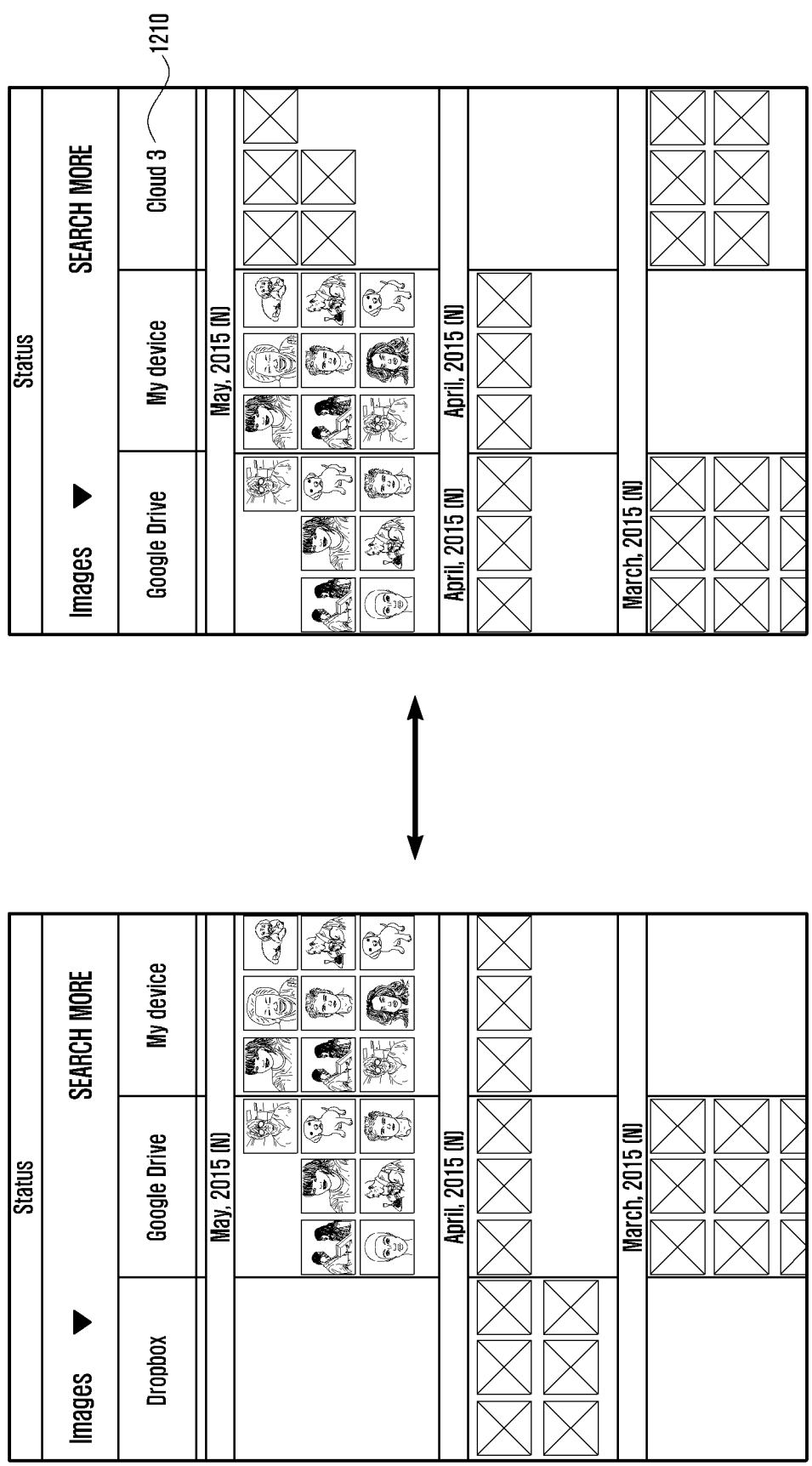
FIG. 12 is a diagram illustrating a first example showing screens in response to a user input of a cloud manager according to various example embodiments of the present disclosure.

FIG. 12 is a diagram illustrating a first example showing screens in response to a user input of a cloud manager according to various example embodiments of the present disclosure.

In various embodiments, with reference to FIG. 12, the electronic device 101 is capable of receiving a user input for changing a type of source to be displayed. For example, the electronic device 101 is capable of receiving a first user input (e.g., an input swiping from right to left), and displaying content stored in a third cloud server 1210 in response to the user input. In contrast, the electronic device 101 is capable of receiving a second user input (e.g., an input swiping from left to right), and displaying content stored in a first cloud server (e.g., dropbox) in response to the user input.

In various example embodiments, the third cloud server 1210 may correspond, for example, to the third cloud server 1112 illustrated in FIG. 11. If the user applies the first user input once more, the fourth cloud server 1114 illustrated in FIG. 11 may be displayed on the screen.

Figure 13:
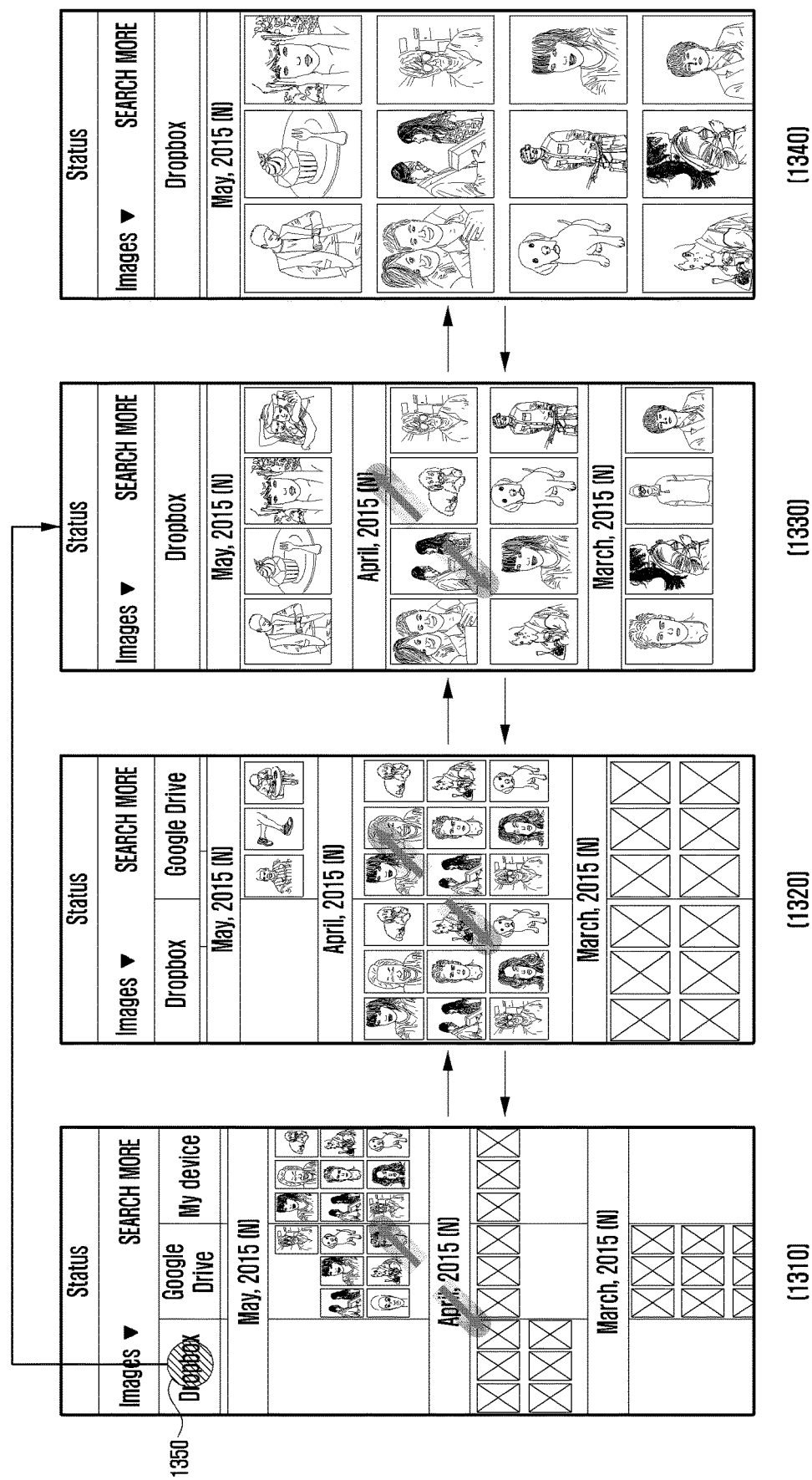
FIG. 13 is a diagram illustrating a second example showing screens in response to a user input of a cloud manager according to various example embodiments of the present disclosure.

FIG. 13 is a diagram illustrating a second example showing screens in response to a user input of a cloud manager according to various example embodiments of the present disclosure.

In various example embodiments, with reference to FIG. 13, the electronic device 101 is capable of adjusting the number of pieces of content, the size of content, and a source of content to be displayed in response to a user input.

In various example embodiments, if the electronic device 101 receives a first user input (e.g., zoom-in gesture) via the screen as shown in diagram 1310 of FIG. 13, it is capable of displaying a screen as shown in diagram 1320 of FIG. 13. On the other hand, if the electronic device 101 receives a second user input (e.g., zoom-out gesture) via the screen as shown in diagram 1320 of FIG. 13, it is capable of displaying a screen as shown in diagram 1320 of FIG. 13. For the respective cases, the number of sources of content is changed from three to two and from two to three.

In various example embodiments, if the electronic device 101 receives a first user input (e.g., zoom-in gesture) via the screen as shown in diagram 1320 of FIG. 13, it is capable of displaying a screen as shown in diagram 1330 of FIG. 13. On the other hand, if the electronic device 101 receives a second user input (e.g., zoom-out gesture) via the screen as shown in diagram 1330 of FIG. 13, it is capable of displaying a screen as shown in diagram 1320 of FIG. 13. For the respective cases, the number of sources of content is changed from two to one and from one to two.

In various example embodiments, the electronic device 101 is capable of displaying only content of a specific source via a third user input 1350, e.g., a tap touch, applied to the screen as shown in diagram 1310 of FIG. 13. For example, the electronic device is capable of displaying a screen as shown in diagram 1330 of FIG. 13, in response to a third user input 1350 regarding first cloud server (e.g., dropbox), applied to a screen as shown in diagram 1310 of FIG. 13.

In various example embodiments, if the electronic device 101 receives a first user input via a screen as shown in diagram 1330 of FIG. 13, it is capable of displaying a screen as shown in diagram 1340 of FIG. 13. For example, the electronic device 101 is capable of decreasing the number of pieces of content to be displayed in a specific source or increasing the size of content to be displayed. As another example, the electronic device 101 may display only content regarding a specified month in a specific source. In contrast, if the electronic device 101 receives a second user input via a screen as shown in diagram 1340 of FIG. 13, it is capable of displaying a screen as shown in diagram 1330 of FIG. 13. For example, the electronic device 101 is capable of increasing the number of pieces of content to be displayed in a specific source or decreasing the size of content to be displayed.

Figure 14:
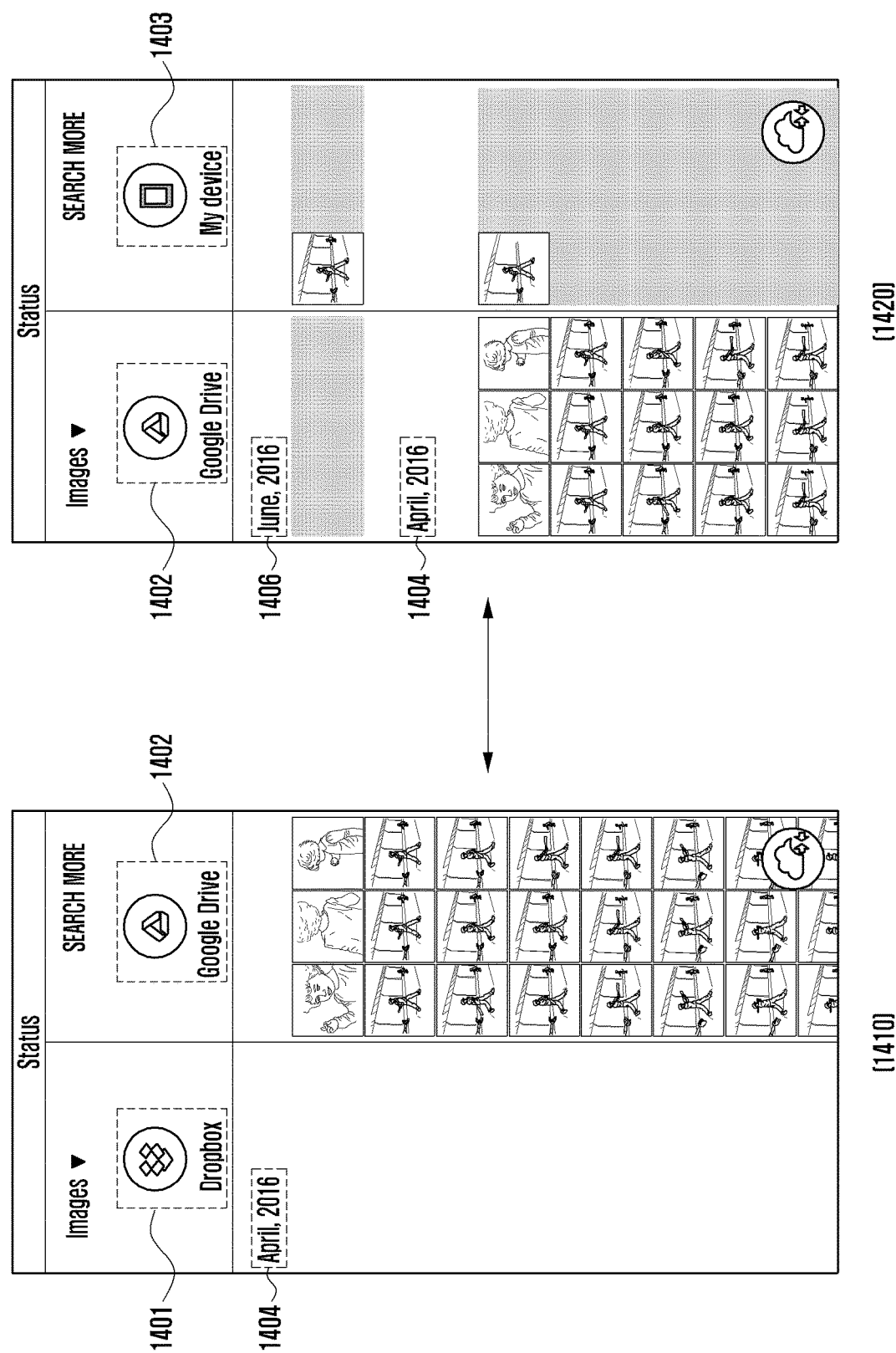
FIG. 14 is a diagram illustrating a third example showing screens in response to a user input of a cloud manager according to various example embodiments of the present disclosure.

FIG. 14 is a diagram illustrating a third example showing screens in response to a user input of a cloud manager according to various example embodiments of the present disclosure.

In various example embodiments, as shown in diagram 1410 of FIG. 14, an electronic device 101 is capable of displaying a first cloud server 1401 and a second cloud server 1402, and a thumbnail 1404 corresponding to content of each source (e.g., content corresponding to April, 2016).

In various example embodiments, the electronic device 101 is capable of receiving a user input (e.g., an input swiping from right to left) as shown in diagram 1410 of FIG. 14, and reconfiguring a previously displayed thumbnail as shown in diagram 1420 of FIG. 14. For example, the electronic device 101 is capable of displaying an electronic device 1403 in response to a user input, instead of displaying a first cloud server 1401. That is, as the displayed source of content is changed, month first displayed on the screen (e.g., month header) may be changed. In this case, a thumbnail may be moved to the closest month among the content of the changed sources. For example, the most recent content is created in April when a first cloud server 1401 and a second cloud server 1402 are displayed; however, the most recent content, stored in the electronic device 1403, may be content created in June. Therefore, thumbnails may be re-configured in such a way as to first display June for the most recent content, included by the second cloud server 1402 and the electronic device 1403, in response to a user input (e.g., an input swiping from right to left). In contrast, thumbnails may be re-configured in such a way as to first display April for the most recent content, included by the first cloud server 1401 and the second cloud server 1402, in response to a user input (e.g., an input swiping from left to right) as shown in diagram 1420 of FIG. 14.

Figure 15:
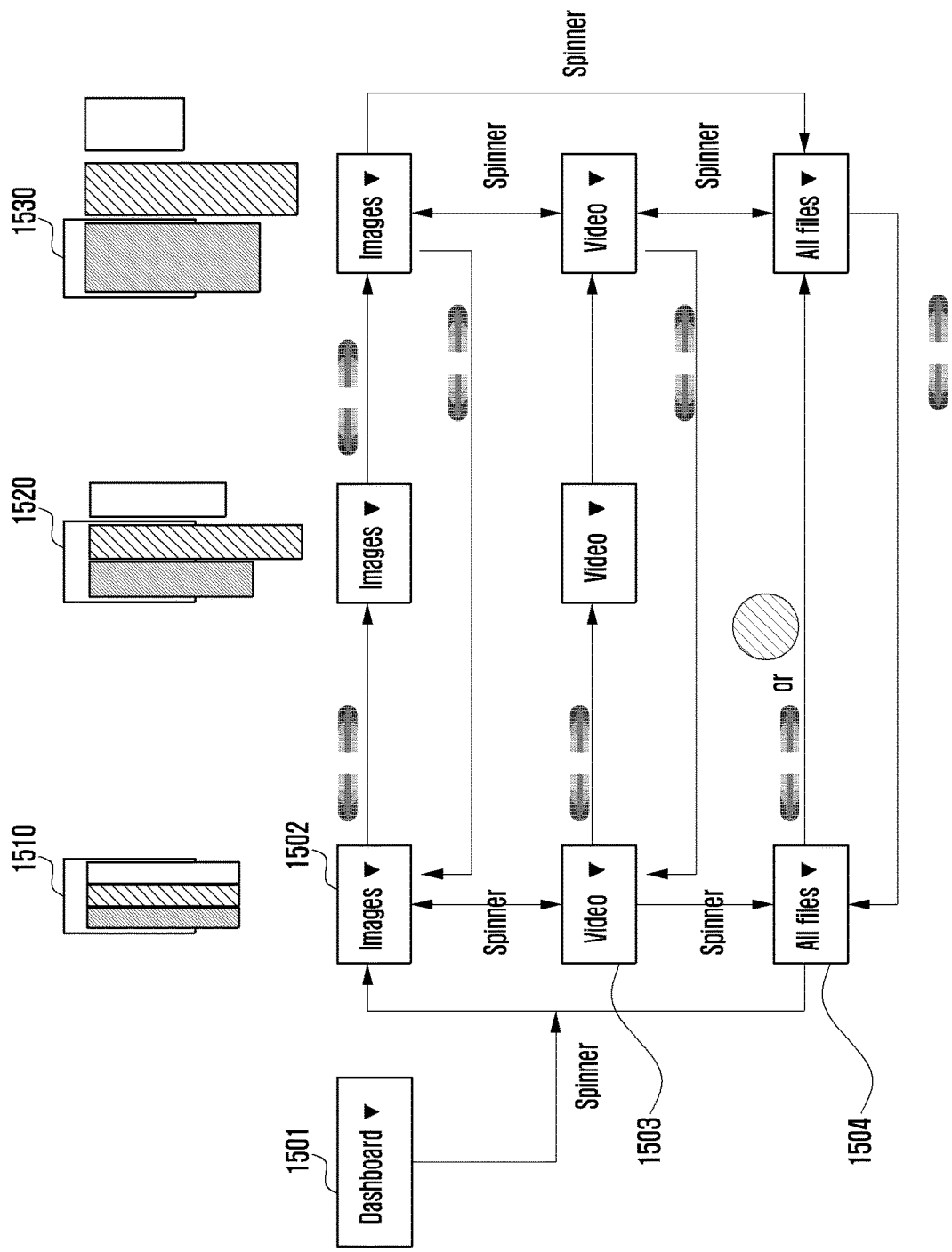
FIG. 15 is a diagram illustrating a fourth example showing screens in response to a user input of a cloud manager according to various example embodiments of the present disclosure.

FIG. 15 is a diagram illustrating a fourth example showing screens in response to a user input of a cloud manager according to various example embodiments of the present disclosure.

In various example embodiments, FIG. 15 illustrates the interaction between the operation for switching between screens in the same type of content of electronic device 101 and the operation for switching between screens based on types of content.

In various example embodiments, the electronic device 101 is capable of decreasing the number of content sources and increasing the size of individual content, from diagram 1510 to 1520 and from diagram 1520 to 1530, respectively, in response to a first user input (e.g., zoom-in gesture). The electronic device 101 is capable of moving content, once, from diagram 1510 to 1530, in response to a first user input. In this case, the electronic device 101 is capable of moving content, once, from diagram 1510 to 1530, considering the speed of the first user input or the distance between the fingers apart from each other, etc.

In various example embodiments, the electronic device 101 is capable of increasing the number of content sources and decreasing the size of individual content, from diagram 1530 to 1520 and from diagram 1520 to 1510, respectively, in response to a second user input (e.g., zoom-out gesture). The electronic device 101 is capable of moving content, once, from diagram 1530 to 1510, in response to a second user input. In this case, the electronic device 101 is capable of moving content, once, from diagram 1530 to 1510, considering the speed of the second user input or the distance between the fingers close to each other, etc.

In various example embodiments, the electronic device 101 is capable of displaying item 1501 for selecting types of content to be displayed. For example, item 1501 may include image 1502, video 1503, all file 1504, etc. The electronic device 101 is capable of selecting a type of content to be displayed on the screen, in response to a third user input (e.g., tap touch).

Figure 16:
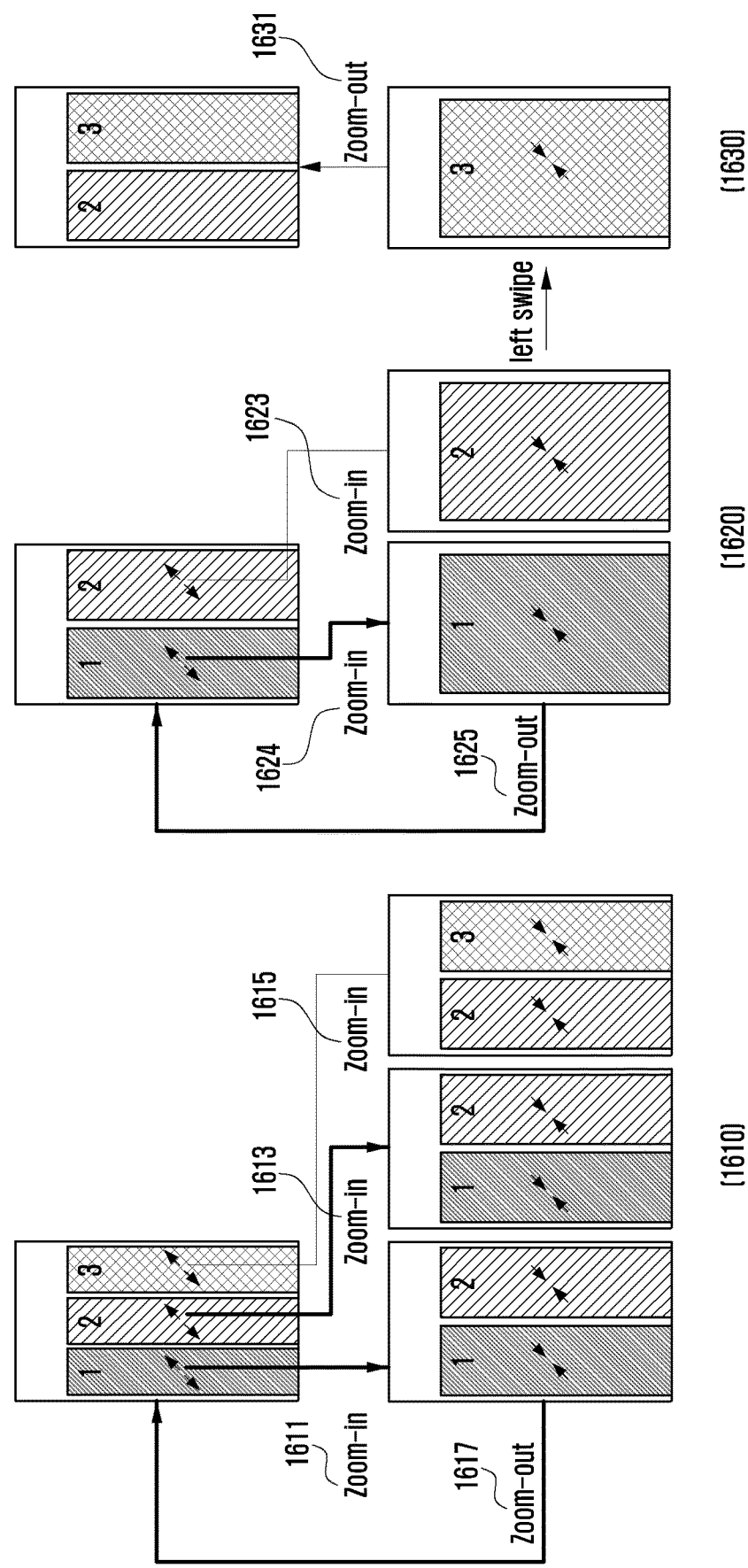
FIG. 16 is a diagram illustrating a fifth example showing screens in response to a user input of a cloud manager according to various example embodiments of the present disclosure.

FIG. 16 is a diagram illustrating a fifth example showing screens in response to a user input of a cloud manager according to various example embodiments of the present disclosure.

In various example embodiments, with reference to FIG. 16, an electronic device 101 is capable of displaying screens that differ from each other, depending on locations where a user input is detected.

In various embodiments, the electronic device 101 is capable of displaying the configuration switching the number of content sources from two to three and from three to two as shown in diagram 1610 of FIG. 16. For example, if the number of content sources is two, the electronic device 101 is capable of increasing the number of content sources to three, in response to a user input 1617. Alternatively, if the number of content sources is three, the electronic device 101 is capable of decreasing the number of content sources to two, in response to a user input 1611, 1613, or 1615.

In various example embodiments, if the electronic device 101 decreases the number of content sources to two, it may display two types of content of source, considering a location where a user input is detected. For example, if the electronic device 101 detects a user input 1611 at the left one of the three content sources, it is capable of displaying two types of content of source including the left source and the middle source. For example, if the electronic device 101 detects a user input 1615 at the right one of the three content sources, it is capable of displaying two types of content of source including the right source and the middle source. For example, if the electronic device 101 detects a user input 1613 at the middle one of the three content sources, it is capable of displaying two types of content of source including the middle source. Although the embodiment shown in diagram 1610 is implemented in such a way that the electronic device 101 displays the left source along with the middle source, it may also be modified in such a way as to display the right source along with the middle source.

In various example embodiments, the electronic device 101 is capable of displaying the configuration switching the number of content sources from one to two and from two to one as shown in diagram 1620 of FIG. 16. For example, if the number of content sources is one, the electronic device 101 is capable of increasing the number of content sources to two, in response to a user input 1625. Alternatively, if the number of content sources is two, the electronic device 101 is capable of decreasing the number of content sources to one, in response to a user input 1623 or 1624.

In various example embodiments, if the electronic device 101 decreases the number of content sources to one, it may display content corresponding to one source, considering a location where a user input is detected. For example, if the electronic device 101 detects a user input 1624 at the left one of the two content sources, it is capable of displaying content of the left source. For example, if the electronic device 101 detects a user input 1623 at the right one of the two content sources, it is capable of displaying content of the right source.

In various example embodiments, the electronic device 101 is capable of switching screens as in diagrams from 1620 to 1630, in response to a user input (e.g., an input swiping from right to left). Therefore, the electronic device 101 is capable of displaying content that is stored in a third source but has not been shown. For example, if the number of displayed content sources is one, the electronic device 101 is capable of increasing the number of content sources to be displayed to two, in response to a user input 1631.

Figure 17:
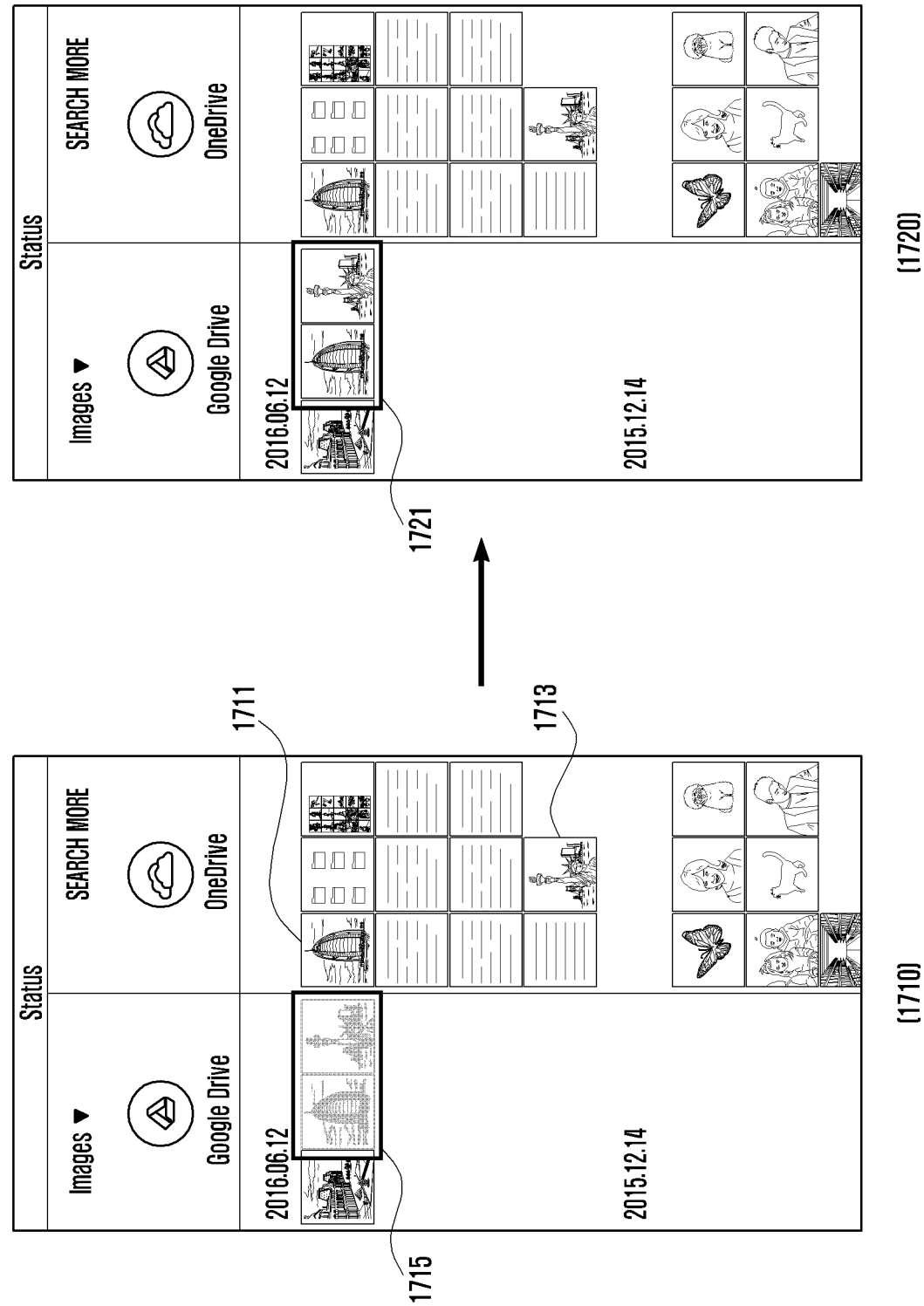
FIG. 17 is a diagram illustrating example screens moving data between different cloud services of a cloud manager according to various example embodiments of the present disclosure.

FIG. 17 is a diagram illustrating an example of screens moving data between different cloud services of a cloud manager according to various example embodiments of the present disclosure.

In various example embodiments, with reference to FIG. 17, an electronic device 101 is capable of moving content from a first source to a second source, via a cloud manager, in response to a user input (e.g., a drag and drop, a command through a menu, etc.). That is, the electronic device 101 is capable of moving data between different clouds, freely.

In various example embodiments, if the electronic device 101 executes (performs) commands for copying, moving, or locking specific content, an operation which takes time, etc., it may indicate that the operation of copying or moving content is in progress. For example, as shown in diagrams 1710 and 1720 of FIG. 17, the electronic device 101 may receive a user input for copying specific content 1711 and 1713 from a second cloud server (e.g., one drive) to a first cloud server (e.g., google drive). The electronic device 101 is capable of displaying, in visually divided shape, that copying content is in progress 1715 until the operation of copying specific content 1711 and 1713 has been completed (e.g., dimply display thumbnails when copying is performed to notify the user that the copying is in progress; display the percentage of progress with %; display the status of progress in from a transparent form to an opaque form 1715 display a preset area of the screen during the operation; locate a thumbnail to a location to be moved after completing the operation content; display a thumbnail, using objects images, text, etc.). As another example, if the operation of copying specific content 1711 and 1713 has been completed, the electronic device 101 is capable of displaying an indication 1721 visually identical to another content which displayed on the screen. Therefore, the user can recognize the progress of an operation, without switching between screens or calling an additional screen. The user can previously recognize (estimate) a screen if the operation is completed.

In various example embodiments, the electronic device 101 is capable of using a column for distinguishing cloud servers or electronic device 101 from each other, in order to gather and display shared content or encoded content, separately, as well as to distinguish sources of content from each other. Therefore, each column may provide functions that differ from each other according to its use. For example, for a column displaying a source storing content, the column may provide functions of moving, copying, or deleting data or files, etc. For a column gathering encoded content, the column may provide a function for encoding or decoding content.

In various example embodiments, if the electronic device 101 moves content from a specific column (e.g., a source column) to another column (e.g., a target column) in response to a user input (e.g., a drag and drop), it may detect characteristics of a column of the currently selected content and a target column of the user input. In this case, the electronic device 101 is capable of displaying types of functions (e.g., move/copy/delete, encode/decode, share/non-share, etc.) that the user can select, which vary according to the characteristics of a column, thereby improving the usability. More specifically, content can be selected in a user specific lane.

Figure 18:
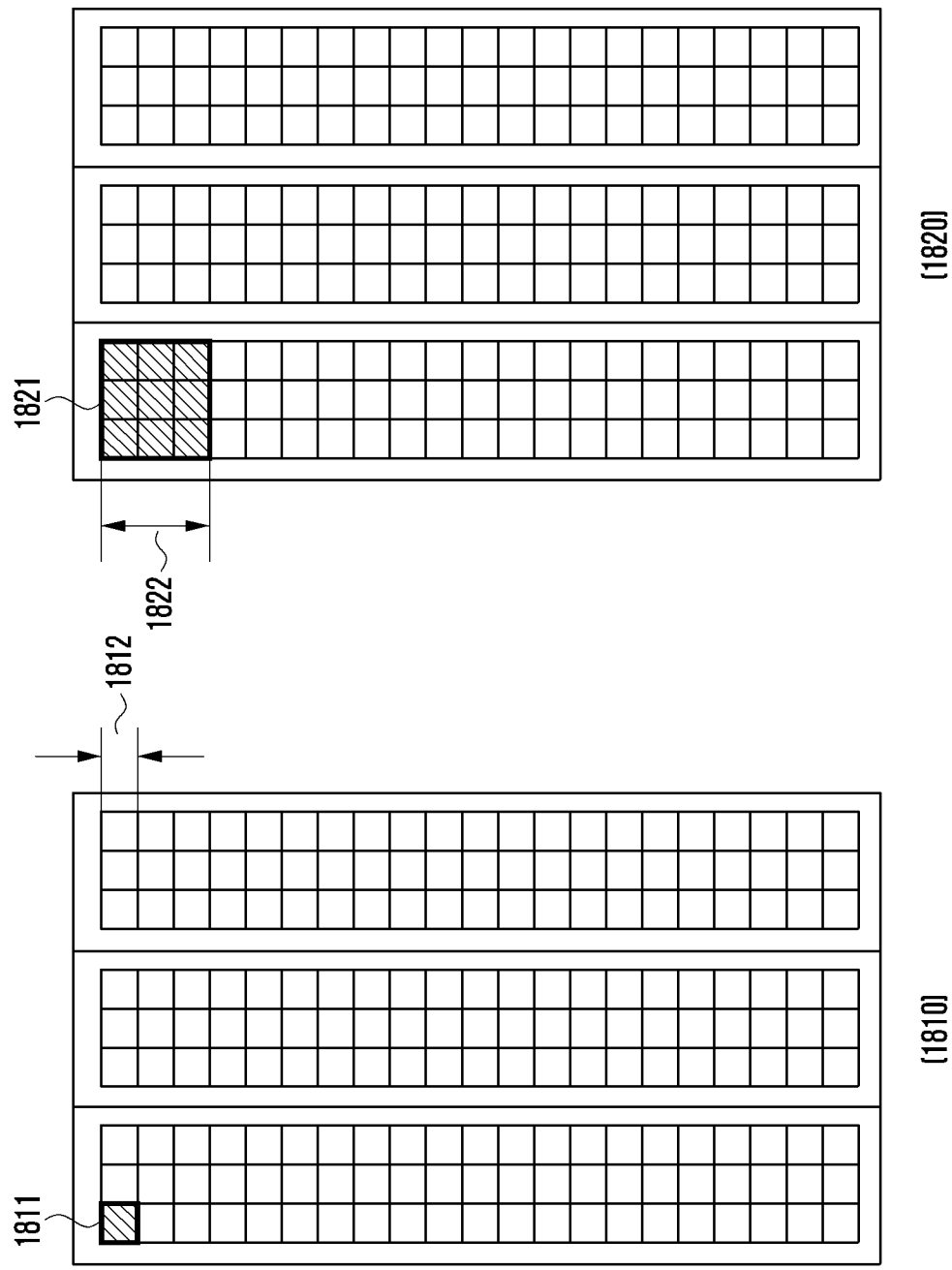
FIG. 18 includes diagrams illustrating an example method for a cloud manager to provide a fast scroll according to various example embodiments of the present disclosure.

FIG. 18 are diagrams illustrating an example method for a cloud manager to provide a fast scroll according to various example embodiments of the present disclosure.

In various example embodiments, with reference to FIG. 18, an electronic device 101 is capable of implement fast scroll via a cloud manager. In general, if a scroll is made on a screen showing a number of thumbnails in a number of columns, the scroll speed may slow or the scrolling may temporarily stop in order to perform operations such as screen synchronization, etc., according to the image loading and the scroll location.

Unlike an existing method of allocating and configuring an individual image to a view 1811 as shown in diagram 1810 of FIG. 18, various example embodiments of the present disclosure enable the electronic device 101 to configure a number of images (e.g., nine images) as one view 1821 as shown in diagram 1820. Therefore, the electronic device 101 is capable of: showing the same number of thumbnails to the user; decreasing the number of real views in reverse proportion to the number of thumbnails allocated to one view; and increasing the length 1822 of one view in proportion to the number of thumbnails allocated to a corresponding view. Therefore, the electronic device 101 decreases time required to bind an image with a view according to the location change of scroll, and increases a unit movement distance when a user scrolls (e.g., the increase of length from reference number 1812 to 1822), thereby implementing fast scroll.

In various example embodiments, the electronic device 101 enables one view to have a number of data collections and processes the ID of the $N^{th}$ data collection to set the ID as a main ID. For example, processing individual data is to calculate a relative location of a user's selecting event generation coordinate in one view information, and creates and processes a data index. For example, a user input is detected as one or two coordinates in a view 1821 as shown in diagram 1820, the electronic device 101 may perform operations regarding content corresponding to the one or two coordinates of view 1821.

In various example embodiments, the electronic device 101 is capable of creating the image of view 1821 in such a way as to combine thumbnails of a number of data with each other in the same size or in various sizes. The electronic device 101 may use a caching algorithm to fast create or load images when performing the binding operation.

In various example embodiments, the electronic device 101 is capable of prioritizing thumbnail caching operations according to cloud servers. For example, if the electronic device 101 performs operations, such as extracting thumbnails from a cloud server and storing the thumbnails in a storage device (e.g., flash memory), the operating speed of a specific cloud server may fast. In this case, the electronic device 101 allocates priority to the specific cloud server, thereby smoothly providing the user with a thumbnail screen. Alternatively, the electronic device 101 allocates priority to an operation for caching thumbnails of columns that have been hidden in both sides of the screen that is currently shown, thereby smoothly providing a screen when the user swipes the screen in the left or right.

Figure 19:
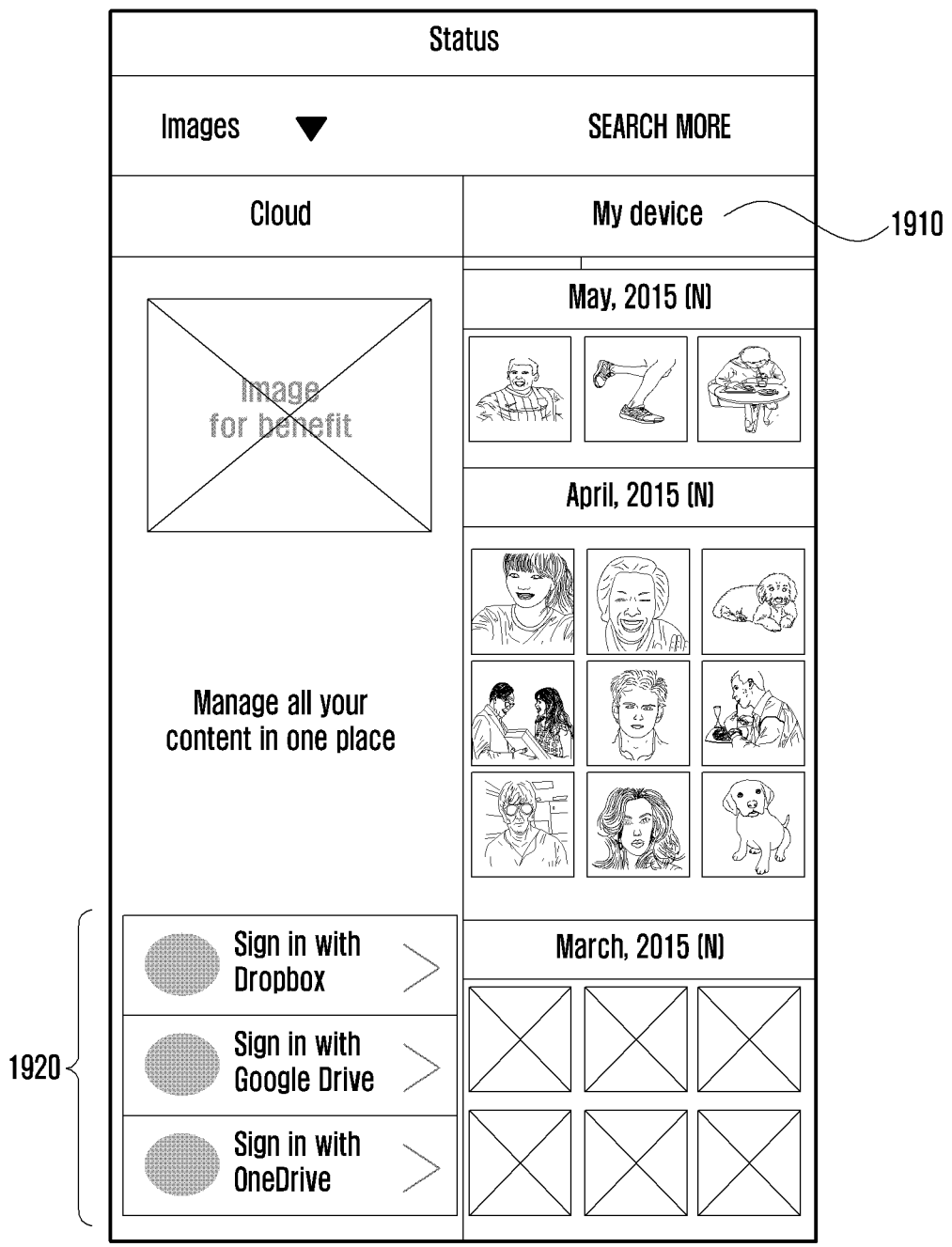
FIG. 19 is a diagram illustrating an example screen that a cloud manager provides to register a cloud service according to various example embodiments of the present disclosure.

FIG. 19 is a diagram illustrating an example screen that a cloud manager provides to register a cloud service according to various example embodiments of the present disclosure.

In various example embodiments, with reference to FIG. 19, if an electronic device 101 initially executes a cloud manager, it is capable of classifying and displaying its stored content 1910. The electronic device 101 is also capable of displaying a screen 1920 for registering at least one cloud server. For example, if the electronic device 101 receives a user input for registering a specific cloud server, it is capable of registering the cloud server in the cloud manager.

In various example embodiments, an electronic device is configured in such a way as to include: a communication module comprising communication circuitry; a display; a memory for storing information regarding at least one piece of content; and a processor. The processor is configured to register a number of cloud servers, to obtain at least one piece of content stored in the cloud servers, to divide the obtained content into areas, based on the cloud servers, and to display the divided areas on a screen.

The processor displays: at least one piece of content corresponding to a first cloud server on a first display area of the screen; and at least one piece of content corresponding to a second cloud server on a second display area of the screen.

The processor divides the content based on an attribute, and displays the divided content, in a state where the content is divided based on the cloud servers. The attribute is one piece of metadata regarding the content.

The metadata comprises at least one of the following: information regarding a date when the content is added, information regarding a date when the content is modified, information regarding a date when the content is created, a type of the content, a size of the content, a file name of the content, and the first alphabet forming a file name of the content.

The processor implements a number of modules corresponding to application programming interfaces (APIs) provided by the cloud servers, respectively.

The processor: receives a user input via the screen; and displays at least one piece of content corresponding to a third cloud server, which is not displayed on the screen, on the first display area or the second display area, in response to the user input.

The processor: receives a user input for copying or moving content stored in the first cloud server, displayed on the first display area, to the second cloud server displayed on the second display area; and displays the content, in visually divided shape, on the second display area, in response to in response to the user input. The display of the content in visually divided shape comprises at least one of the following: displaying a status bar or a progress indicator (percentage of progress) (%) representing how much the copying or moving has been made; displaying the content from in transparent form to in opaque form according to how much the copying or moving has been made; displaying the content on: a preset area of the screen while the content is moving or copying; and the second display area when the content has been copied or moved; and displaying the progress of the copying or moving operation using an object such as an image or text.

The processor: receives a user input via the screen; and displays at least one piece of content corresponding to a third cloud server, which is not displayed on the screen, on the first display area or the second display area, in response to the user input; and at least one piece of content displayed on the first display area and the second display area is divided and displayed, based on the attribute of at least one piece of content corresponding to the third cloud server.

The processor: receives a user input via the screen; and adjusts and displays the number of cloud serves to be displayed on the screen, in response to the user input.

The processor: decreases the number of cloud servers if the user input is a zoom-in gesture; and increases the number of cloud servers if the user input is a zoom-out gesture.

In various example embodiments, a method of displaying content of an electronic device is configured in such a way as to include: registering a number of cloud servers; obtaining at least one piece of content stored in the cloud servers; and dividing the obtained content into areas, based on the cloud servers, and displaying the divided areas on a screen.

Dividing the obtained content into areas and displaying the divided areas on a screen includes: displaying at least one piece of content corresponding to a first cloud server on a first display area of the screen; and displaying at least one piece of content corresponding to a second cloud server on a second display area of the screen.

The method further includes: dividing the content based on an attribute, and displaying the divided content, in a state where the content is divided based on the cloud servers. The attribute is one piece of metadata regarding the content.

The metadata is at least one of the following: information regarding a date when the content is added, information regarding a date when the content is modified, information regarding a date when the content is created, a type of the content, a size of the content, a file name of the content, and the first alphabet forming a file name of the content.

The operation of registering a number of cloud servers include: implementing a number of modules corresponding to application programming interfaces (APIs) provided by the cloud servers, respectively.

The operation of dividing the obtained content into areas and displaying the divided areas on a screen includes: receiving a user input via the screen; and displaying at least one piece of content corresponding to a third cloud server, which is not displayed on the screen, on the first display area or the second display area, in response to the user input.

The method further includes: receiving a user input for copying or moving content stored in the first cloud server, displayed on the first display area, to the second cloud server displayed on the second display area; and displaying the content, in visually divided shape, on the second display area, in response to in response to the user input. The operation of displaying the content in visually divided shape includes at least one of the following: displaying a status bar or a progress indicator (percentage of progress) (%) representing how much the copying or moving has been made; displaying the content from in transparent form to in opaque form according to how much the copying or moving has been made; displaying the content on: a preset area of the screen while the content is moving or copying; and the second display area when the content has been copied or moved; and displaying the progress of the copying or moving operation using an object such as an image or text.

The method further includes: receiving a user input via the screen; and displaying at least one piece of content corresponding to a third cloud server, which is not displayed on the screen, on the first display area or the second display area, in response to the user input. At least one piece of content displayed on the first display area and the second display area is divided and displayed, based on the attribute of at least one piece of content corresponding to the third cloud server.

The operation of dividing the obtained content into areas and displaying the divided areas on a screen includes: receiving a user input via the screen; and adjusting and displaying the number of cloud serves to be displayed on the screen, in response to the user input.

The method further includes: decreasing the number of cloud servers if the user input is a zoom-in gesture; and increasing the number of cloud servers if the user input is a zoom-out gesture.

As described above, electronic devices according to various example embodiments of the present disclosure are capable of providing a cloud integration application (cloud manager). Electronic devices allow a user to access different types of cloud services via one application and refer to various types of data provided by the cloud servers. Although data that the user needs is stored in different cloud servers, the electronic devices according to the present disclosure allow the user to easily search for data and perform the corresponding function via one application.

The term "module" used in the present disclosure may refer, for example, to a unit including one or more combinations of hardware, software, and firmware. The "module" may be interchangeable with a term, such as "unit," "logic," "logical block," "component," or "circuit". The "module" may be a minimum unit of a component formed as one body or a part thereof, may be a minimum unit for performing one or more functions or a part thereof, and may be implemented mechanically or electronically. For example, the "module" according to an example embodiment of the present disclosure may include at least one of a dedicated processor, a CPU, an application-specific integrated circuit (ASIC) chip, a field-programmable gate array (FPGA), and a programmable-logic device for performing certain operations which have been known or are to be developed in the future.

Examples of computer-readable media include: magnetic media, such as hard disks, floppy disks, and magnetic tape; optical media such as compact disc read only memory (CD-ROM) disks and digital versatile disc (DVD), magneto-optical media, such as floptical disks, and hardware devices that are specially configured to store and perform program instructions, such as ROM, RAM, and flash memory. Examples of program instructions include machine code instructions created by assembly languages, such as a compiler, and code instructions created by a high-level programming language executable in computers using an interpreter. The described hardware devices may be configured to act as one or more software modules in order to perform the operations and methods described above, or vice versa.

Modules or programming modules according to example embodiments of the present disclosure may include one or more components, remove part of the components described above, or include new components. The operations performed by modules, programming modules, or the other components, according to the present disclosure, may be executed in serial, parallel, repetitive or heuristic fashion. Part of the operations can be executed in any other order, omitted, or executed with additional operations.

Although various example embodiments of the disclosure have been described in detail above, it should be understood that many variations and modifications of the disclosure herein described, which may be apparent to those skilled in the art, will still fall within the spirit and scope of the embodiments of the disclosure as defined in the appended claims and their equivalents.

The invention claimed is:

1. An electronic device comprising:
a communication module comprising communication circuitry;
a display;
a memory configured to store information regarding at least one content; and
a processor configured to:
register a plurality of cloud servers to display obtained content in display areas on a screen of the display;
obtain at least one content stored in at least one of the plurality of registered cloud servers; and
display the obtained content in display areas on the screen of the display, the display areas being divided based on the registered cloud servers.

2. The electronic device of claim 1, wherein the processor is configured to:
display
at least one content corresponding to a first cloud server on a first display area of the screen; and
at least one content corresponding to a second cloud server on a second display area of the screen.

3. The electronic device of claim 2, wherein the processor is configured to:
divide the content based on an attribute; and
display the divided content based on the cloud servers,
wherein the attribute comprises metadata regarding the content.

4. The electronic device of claim 3, wherein the metadata is at least one of:
information regarding a date when the content is added, information regarding a date when the content is modified, information regarding a date when the content is created, a type of the content, a size of the content, a file name of the content, and the first alphabet forming a file name of the content.

5. The electronic device of claim 1, wherein the processor is configured to implement a plurality of modules corresponding to application programming interfaces (APIs) provided by respective cloud servers.

6. The electronic device of claim 2, wherein the processor is configured to:

receive an input via the screen; and display, in response to the input, at least one content corresponding to a third cloud server on the first display area or on the second display area, wherein the at least one content corresponding to the third cloud server was not originally displayed on the screen.

7. The electronic device of claim 2, wherein the processor is configured to:

receive an input for copying or moving content stored in the first cloud server, displayed on the first display area, to the second cloud server displayed on the second display area; and display, in response to the input, the content in visually divided shape on the second display area, wherein the display of the content in visually divided shape comprises at least one of the following:

displaying a status bar or a progress indicator (percentage of progress) (%) representing how much the copying or moving has been made;

displaying the content in transparent form to opaque form based on how much the copying or moving has been performed;

displaying the content on a preset area of the screen while the content is moving or copying; and displaying the content on the second display area when the content has been copied or moved; and displaying the progress of the copying or moving operation using an object comprising an image or text.

8. The electronic device of claim 3, wherein the processor is configured to:

receive an input via the screen; and display, in response to the input, at least one content corresponding to a third cloud server on the first display area or on the second display area, wherein the at least one content corresponding to the third cloud server was not originally displayed on the screen, wherein the at least one content displayed on the first display area and the at least one contend displayed on the second display area is divided and displayed, based on the attribute of at least one content corresponding to the third cloud server.

9. The electronic device of claim 1, wherein the processor is configured to:

receive an input via the screen; and adjust and display the number of cloud servers to be displayed on the screen, in response to the input.

10. The electronic device of claim 9, wherein the processor is configured to: decrease the number of cloud servers if the user input comprises a zoom-in gesture; and increase the number of cloud servers if the user input comprises a zoom-out gesture.

11. A method of displaying content of an electronic device comprising:

registering a plurality of cloud servers to display obtained content in display areas on a screen of a display of the electronic device;

obtaining at least one content stored in the plurality of registered cloud servers; and displaying the obtained content into display areas on the screen of the display of the electronic device, the display areas being divided based on the registered cloud servers, on a screen.

12. The method of claim 11, wherein dividing the obtained content into areas and displaying the divided areas on a screen comprises:

displaying at least one content corresponding to a first cloud server on a first display area of the screen; and displaying at least one content corresponding to a second cloud server on a second display area of the screen.

13. The method of claim 12, further comprising:

dividing the content based on an attribute, and displaying the divided content based on the cloud servers, wherein the attribute comprises metadata regarding the content.

14. The method of claim 13, wherein the metadata is at least one of:

information regarding a date when the content is added, information regarding a date when the content is modified, information regarding a date when the content is created, a type of the content, a size of the content, a file name of the content, and the first alphabet forming a file name of the content.

15. The method of claim 11, wherein registering a plurality of cloud servers comprises:

implementing a plurality of modules corresponding to application programming interfaces (APIs) provided by respective cloud servers.

16. The method of claim 12, wherein dividing the obtained content into areas and displaying the divided areas on a screen comprises:

receiving an input via the screen; and displaying, in response to the input, at least one piece of content corresponding to a third cloud server on the first display area or on the second display area, wherein the at least one piece of content corresponding to the third cloud server was not originally displayed on the screen.

17. The method of claim 12, further comprising:

receiving an input for copying or moving content stored in the first cloud server, displayed on the first display area, to the second cloud server displayed on the second display area; and displaying the content, in a visually divided shape, on the second display area, in response to in response to the input, wherein displaying the content in visually divided shape comprises at least one of the following:

displaying a status bar or a progress indicator (percentage of progress) (%) representing how much the copying or moving has been made;

displaying the content in transparent form to opaque form based on how much the copying or moving has been made;

displaying the content on: a preset area of the screen while the content is moving or copying; and the second display area when the content has been copied or moved; and displaying the progress of the copying or moving operation using an object comprising an image or text.

18. The method of claim 13, further comprising:

receiving an input via the screen; and displaying, in response to the input, at least one content corresponding to a third cloud server on the first display area or on the second display area, wherein the at least one content corresponding to the third cloud server was not originally displayed on the screen, wherein at least one content displayed on the first display area and the second display area is divided and displayed, based on the attribute of at least one content corresponding to the third cloud server.

19. The method of claim 11, wherein dividing the obtained content into areas and displaying the divided areas on a screen comprises:

receiving an input via the screen; and adjusting and displaying the number of cloud serves to be displayed on the screen, in response to the input.

20. The method of claim 19, further comprising:

decreasing the number of cloud servers if the user input comprises a zoom-in gesture; and increasing the number of cloud servers if the user input comprises a zoom-out gesture.

* * * * *